US009171390B2

(12) United States Patent
Sumner et al.

(10) Patent No.: US 9,171,390 B2
(45) Date of Patent: Oct. 27, 2015

(54) AUTOMATIC AND SEMI-AUTOMATIC GENERATION OF IMAGE FEATURES SUGGESTIVE OF MOTION FOR COMPUTER-GENERATED IMAGES AND VIDEO

(75) Inventors: Robert Sumner, Zürich (CH); Johannes Schmid, Zürich (CH); Markus Gross, Uster (CH); Huw Bowles, Victoria (AU)

(73) Assignees: DISNEY ENTERPRISES, INC., Burbank, CA (US); ETH Zürich (Eidgenöessische Technische Hochschule Zürich), Zürich (CH)

( * ) Notice: Subject to any disclaimer, the term of this patent is extended or adjusted under 35 U.S.C. 154(b) by 190 days.

(21) Appl. No.: 12/843,827

(22) Filed: Jul. 26, 2010

(65) Prior Publication Data
US 2011/0181606 A1 Jul. 28, 2011

Related U.S. Application Data

(60) Provisional application No. 61/296,459, filed on Jan. 19, 2010.

(51) Int. Cl.
*G06T 13/00* (2011.01)
(52) U.S. Cl.
CPC ...................................... *G06T 13/00* (2013.01)
(58) Field of Classification Search
None
See application file for complete search history.

(56) References Cited

U.S. PATENT DOCUMENTS

| 5,809,219 | A | * | 9/1998 | Pearce et al. | 345/426 |
|---|---|---|---|---|---|
| 6,426,755 | B1 | | 7/2002 | Deering | |
| 6,654,020 | B2 | * | 11/2003 | Mori | 345/475 |
| 6,956,574 | B1 | | 10/2005 | Cailloux et al. | |
| 7,084,875 | B2 | * | 8/2006 | Plante | 345/473 |
| 7,123,265 | B2 | * | 10/2006 | Marshall et al. | 345/503 |
| 7,193,629 | B2 | * | 3/2007 | Kake et al. | 345/581 |

(Continued)

OTHER PUBLICATIONS

Jarke J. van Wijk, "On new types of solid models and their visualization with ray tracing", Delft University Press, 1986.*

(Continued)

*Primary Examiner* — Devona Faulk
*Assistant Examiner* — William Beutel
(74) *Attorney, Agent, or Firm* — Kilpatrick Townsend & Stockton LLP

(57) ABSTRACT

In an animation processing system, generating images to be viewable on a display using a computer that are generated based on scene geometry obtained from computer readable storage and animation data representing changes over time of scene geometry elements, but also images can be modified to include shading that is a function of positions of objects at other than the current instantaneous time for a frame render such that the motion effect shading would suggest motion of at least one of the elements to a viewer of the generated images. Motion effects provide, based on depiction parameters and/or artist inputs, shading that varies for at least some received animation data, received motion depiction parameters, for at least one pixel, a pixel color is rendered based on motion effect program output and at least some received scene geometry, such that the output contributes to features that would suggest the motion.

16 Claims, 12 Drawing Sheets

(56) References Cited

U.S. PATENT DOCUMENTS 8,416,245 B2 * 4/2013 Bond .......................... 345/473
2008/0297518 A1 * 12/2008 Sayre et al. .................. 345/474

OTHER PUBLICATIONS

Glassner ("Spacetime Ray Tracing for Animation", Computer Graphics and Applications, IEEE (vol. 8, Issue: 2), pp. 60-70, Mar. 1988).*
Brostow, Gabriel J., et al. "Image-based motion blur for stop motion animation," Proceedings of the 28th annual conference on Computer graphics and interactive techniques, p. 561-566, Aug. 2001.
Kawagishi, Y.; Hatsuyama, K.; and Kondo, K. "Cartoon blur: nonphotorealistic motion blur," Computer Graphics International, 2003. Proceedings, vol., No., pp. 276-281, Jul. 9-11, 2003, URL: http://ieeexplore.ieee.org/stamp/stamp.jsp?arnumber=1214482&isnumber=27295.
Masuch, Maic; Schlechtweg, Stefan; and Schulz, Ronny. "Speedlines: depicting motion in motionless pictures," in ACM SIG-GRAPH '99. Conference abstracts and application (SIGGRAPH '99). ACM, New York, NY, USA. 1999.
Raskar, Ramesh; Ziegler, Remo; Wiliwacher, Thomas. "Cartoon dioramas in motion," In proceedings of the 2$^{nd}$ international symposium on Non-Photorealistic Animation and Rendering (NPAR '02). ACM, New York, NY, USA, 7-ff.
Agarwala, a. et al., "Interactive digital photomontage," ACM Trans. Graph. 2004, vol. 23, No. 3, pp. 294-302.
Assa, J. et al., "Action synopsis: poseselection and illustration," ACM Trans. Graph., 2005, vol. 24, No. 3, pp. 667-676.
Bennett, E. P. et al., "Computational time-lapse video," ACM Trans. Graph., 2007, vol. 26, No. 3, pp. 1-6.
Bouvier-Zappa, S. et al., "Motion cues for illustration of skeletal motion capture data," Non-Photorealistic Animation and Rendering, 2007, pp. 133-140.
Burr, D. C. et al., "Direct evidence that "speed-lines" influence motion mechanisms," Journal of Neuroscience, 2002, vol. 22, No. 19, pp. 8661-8664.
Chenney, S. et al., "Simulating cartoon style animation," NPAR '02: Proceedings of the 2ndinternational symposium on Non-photorealistic animation and rendering, 2002, pp. 133-138.
Collomosse, J .P. et al., "Rendering cartoon-style motion cues in post-production video," Graphical Models, 2005, vol. 67, No. 6, pp. 549-564.
Cutting, J. E. "Representing motion in a static image: constraints and parallels in art, science, and popular culture," Perception, 2002, vol. 31, No. 10, pp. 1165-1193.
Goldman, D. B. et al., "Schematic storyboarding for video visualization and editing," ACM Trans. Graph., 2006, vol. 25, No. 3, pp. 862-871.
Haller, M. et al., "Non-photorealistic rendering techniques for motion in computer games," Comput. Entertain., 2004, vol. 2, No. 4, pp. 1-13.
Lake, A. et al., "Stylizedrendering techniques for scalable real-time 3d animation," NPAR '00: Proceedings of the 1st international symposium on Non-photorealistic animation and rendering, 2000, pp. 13-22.
Liu, C. et al., "Motion magnification," ACM Trans. Graph., 2005, vol. 24, No. 3, pp. 519-526.
Nienhaus, M. et al., "Depicting dynamics using principles of visual art and narrations," IEEE Computer Graphics and Applications, 2005, vol. 25, No. 3, pp. 40-51.
Noble, P. et al., "Automatic expressive deformations for implying and stylizing motion," The Visual Computer, 2007, vol. 23, No. 7, pp. 57-64.
Ramsey, S. D. et al., "Ray bilinear patch intersections," Journal of Graphics, GPU, and Game Tools, 2004, vol. 9, No. 3, pp. 41-47.
Sung, K. et al., "Spatial-temporal antialiasing," IEEE Transactions on Visualization and Computer Graphics, 2002, vol. 8, No. 2, pp. 144-153.
Wang, J. et al., "The cartoon animation filter," ACM Trans. Graph., 2006, vol. 25, No. 3, pp. 1169-1173.

* cited by examiner

AUTOMATIC AND SEMI-AUTOMATIC GENERATION OF IMAGE FEATURES SUGGESTIVE OF MOTION FOR COMPUTER-GENERATED IMAGES AND VIDEO

CROSS-REFERENCES TO RELATED APPLICATION

The present application claims benefit of priority under 35 USC §119(e) of Provisional Patent Application No. 61/296,459, filed on Jan. 19, 2010, titled "Automatic and Semi-Automatic Generation of Image Features Suggestive of Motion For Computer-Generated Images and Video", the entire contents of which are herein incorporated by reference for all purposes.

BACKGROUND

The present invention relates to systems and methods for computer-generated image processing in general and in particular to altering a flow of a rendering image to allow for processing of inserted graphics elements that are frame specific and represent time-aggregation of other objects.

It is well known that an animated visual presentation can be created by creating individual static images (frames). The static images, when displayed in sequence can form an animated visual presentation, such as a short sequence or a feature length film. Thus, each frame as a time at which it is to be displayed in the sequence, i.e., a "frame time". In computer-generated imagery, the imagery to be shown can be represented by objects having shapes, textures and locations within an image and those can change over time. This representation is often referred to as the scene geometry, which can be stored in an animation database as objects and animation information describing how the objects move. For example, the animation database might include a sphere, an indication of a texture to be applied.

A rendering engine can then use this animation to "render" images, i.e., determine the colors of pixels in a pixel array that collectively represents an image and do this for a sequence of images to form an animation sequence. When displayed, this presents to the user imagery of the objects moving through a scene. Of course, typically an animation sequence is more complicated than just a sphere, as it may have millions of objects, some moving and some not. In effect, a 3D rendering engine reads the animation database, determines the location in a virtual 3D space of a camera viewpoint and a camera view port (such as a rectangle representing the view of the virtual 3D space visible from the camera), what objects are visible within that view port and what color contribution objects make to the pixel color for the pixels of the image that are mapped to points of the view port.

The fields of rendering and generating scene geometry to represent an artist's view for an animation sequence are well established and since the rendering process and scene representation by collections of virtual objects are well-known, they need not be described here in detail for an understanding of the concepts presented herein.

REFERENCES

Examples of previous approaches and general description of problems and terminology in this space can be found in the literature, such as the references cited below:

[Blair] Blair, P., "*Cartoon Animation*", Walter Foster Publishing (1994).

[Cook] Cook, R. L., Porter, T., and Carpenter, L., "Distributed Ray Tracing", *Proceedings SIGGRAPH '84, Comput. Graph.* v. 18, n. 3, pp. 137-145 (1984).

HAEBERLI, P., AND AKELEY, K. 1990. The accumulation buffer: hardware support for high-quality rendering. In *SIGGRAPH '90: Proceedings of the 17th annual conference on Computer graphics and interactive techniques*, ACM, New York, N.Y., USA, 309-318.

HALLER, M., HANL, C., AND DIEPHUIS, J. 2004. Non-photorealistic rendering techniques for motion in computer games. *Comput. Entertain.* 2, 4, 11-11.

KOREIN, J., AND BADLER, N. 1983. Temporal anti-aliasing in computer generated animation. In *SIGGRAPH '83: Proceedings of the 10th annual conference on Computer graphics and interactive techniques*, ACM, New York, N.Y., USA, 377-388.

KOREIN, J., AND BADLER, N. 1983. Temporal anti-aliasing in computer generated animation. In *SIGGRAPH '83: Proceedings of the 10th annual conference on Computer graphics and interactive techniques*, ACM, New York, N.Y., USA, 377-388.

LASSETER, J. 1987. Principles of traditional animation applied to 3d computer animation. In *SIGGRAPH '87: Proceedings of the 14th annual conference on Computer graphics and interactive techniques*, ACM, New York, N.Y., USA, 35-44.

MASUCH, M., SCHLECHTWEG, S., AND SCHULZ, R. 1999. Speedlines: depicting motion in motionless pictures. In *SIGGRAPH '99: ACM SIGGRAPH 99 Conference abstracts and applications*, ACM, New York, N.Y., USA, 277.

NIENHAUS, M., AND DÖLLNER, J. 2005. Depicting dynamics using principles of visual art and narrations. *IEEE Computer Graphics and Applications* 25, 3 (May/June), 40-51.

POTMESIL, M., AND CHAKRAVARTY, I. 1983. Modeling motion blur in computer-generated images. *SIGGRAPH Comput. Graph.* 17, 3,389-399.

RAMSEY, S. D., POTTER, K., AND HANSEN, C. 2004. Ray bilinear patch intersections. *journal of graphics, gpu, and game tools* 9, 3,41-47.

SUNG, K., PEARCE, A., AND WANG, C. 2002. Spatial-temporal antialiasing. *IEEE Transactions on Visualization and Computer Graphics* 8, 2, 144-153.

WHITAKER, H., AND HALAS, J. 1981. *Timing for Animation*. Focal Press.

Conventional Animation Systems

A typical animation system accepts various inputs, presents intermediate results and allows artists and others to modify an animation using a variety of tools. Examples include a module for keyframing, a module for dynamic simulation, a module to provide motion capture data as inputs to the animation system, etc. The output of the animation system can be used to create an image sequence that, when displayed in sequence, conveys an animation—a presentation of virtual objects (and may be real photographed objects) that move throughout a scene.

One module that an animation system might have is a motion depiction module that modifies the result to depicting motion, as might be used to depict motion in a still image. Techniques in common use today stem from ones first proposed in the early 1980's. [Korein] and [Potmesil] introduced motion blur to the computer graphics community in 1983. One year later, [Cook] presented a distributed ray tracing process that has been widely implemented in rendering engines ever since.

Artists working in other mediums have employed a variety of techniques to convey motion, both in still images and in animations. Drastic and stylized effects were pioneered by comic book artists. Their entire medium of expression is based on depicting action in still frames and they developed a grab bag of techniques including motion lines, multiple images, streaking, and even stylized blurring effects. However, the non-photorealistic depiction of motion is not restricted to still images. Effects such as multiple images, speed lines, and blurring are some of the most basic tools used by traditional animators to convey motion in hand-drawn 2D cartoons; [Blair] shows some examples.

When it comes to motion in 3D animations, it is primarily conveyed by the actual movement of virtual objects on the screen and relative to each other. During almost a hundred years of 2D animation, the community has developed a set of principles for the creation of believable animation that serves the purpose of the story. For quickly moving objects, it is common in both comics and animated film to add visual cues to illustrate the nature of the motion (see [Whitaker], for example). Among such visual cues are speed lines (also called motion lines), stroboscopic images or outlines, and dust clouds. [Masuch] describes the use of speed lines and stroboscopic images in 3D renderings. [Haller] presents a system for generating similar effects in computer games. Both methods are heavily specialized towards the effects they can achieve. A more general way of generating visual cues based on object motion is described in [Nienhaus], which allows one to define rules for the depiction of certain events or sequences based on a scene graph representation of geometry and a behavior graph representation of animation. Nonetheless, this is still quite specific.

Motion Blur

Motion blur is a topic in computer graphics that has seen a lot of attention and continues to do so. If a sequence of images represents a sampled view of continuous motion, then sampling theory from signal processing applies to the reconstruction of that motion. The input signal has to be filtered properly in order to prevent aliasing in the output; [Potmesil] describes this. Another motivation for motion blur can be found in the simulation of how real film cameras capture images. Due to the time it takes to expose a single frame of film, fast-moving objects will distribute their luminance over multiple locations of the film, thus creating a blurred appearance.

A common way to deal with these issues is to super-sample images in time, either on a per-pixel [Cook] or on a per-image level [Haeberli]. Another approach is to super-sample the visibility and luminance function for each pixel using information about the moving geometry, as is described by [Korein]. [Sung] presented a summary of motion blur techniques, together with a mathematical formulation of the problem. The common goal for all of these techniques is to treat temporal aliasing in a mathematically or physically correct way. However, as in rendering in general, physical correctness is not necessarily a requirement. In fact, strict limitation to physical correctness and standard motion blur can tend to diminish the desired subtle detailing of motion in animations and might limit what an artist can easily do with an animation system. In view of the above, improved methods and apparatus for generating image features suggestive of motion for are desired.

BRIEF SUMMARY OF THE INVENTION

In embodiments of an animation processing system, generating images to be viewable on a display using a computer that are generated based on scene geometry obtained from computer readable storage and animation data representing changes over time of elements of the scene geometry, based on inputs to a motion effects program. In embodiments, motion depiction parameters and/or artist inputs are used in specifying inputs to motion effects programs using at least some received animation data, wherein for at least one pixel, a pixel color is rendered based on at least some scene geometry that is sampled at more than one time.

In a particular implementation, an artist provides parameter selections to one or more motion program and the motion programs operate on the scene geometry over a plurality of frame times to determine pixel color contributions for a given frame time. The parameters might include weights over time for effects, type of effect, seed points for speed lines, and weighting by distance from pixel to characterize width and result of speed lines or other effects.

The following detailed description together with the accompanying drawings will provide a better understanding of the nature and advantages of the present invention.

DETAILED DESCRIPTION OF THE INVENTION

Figure 1:
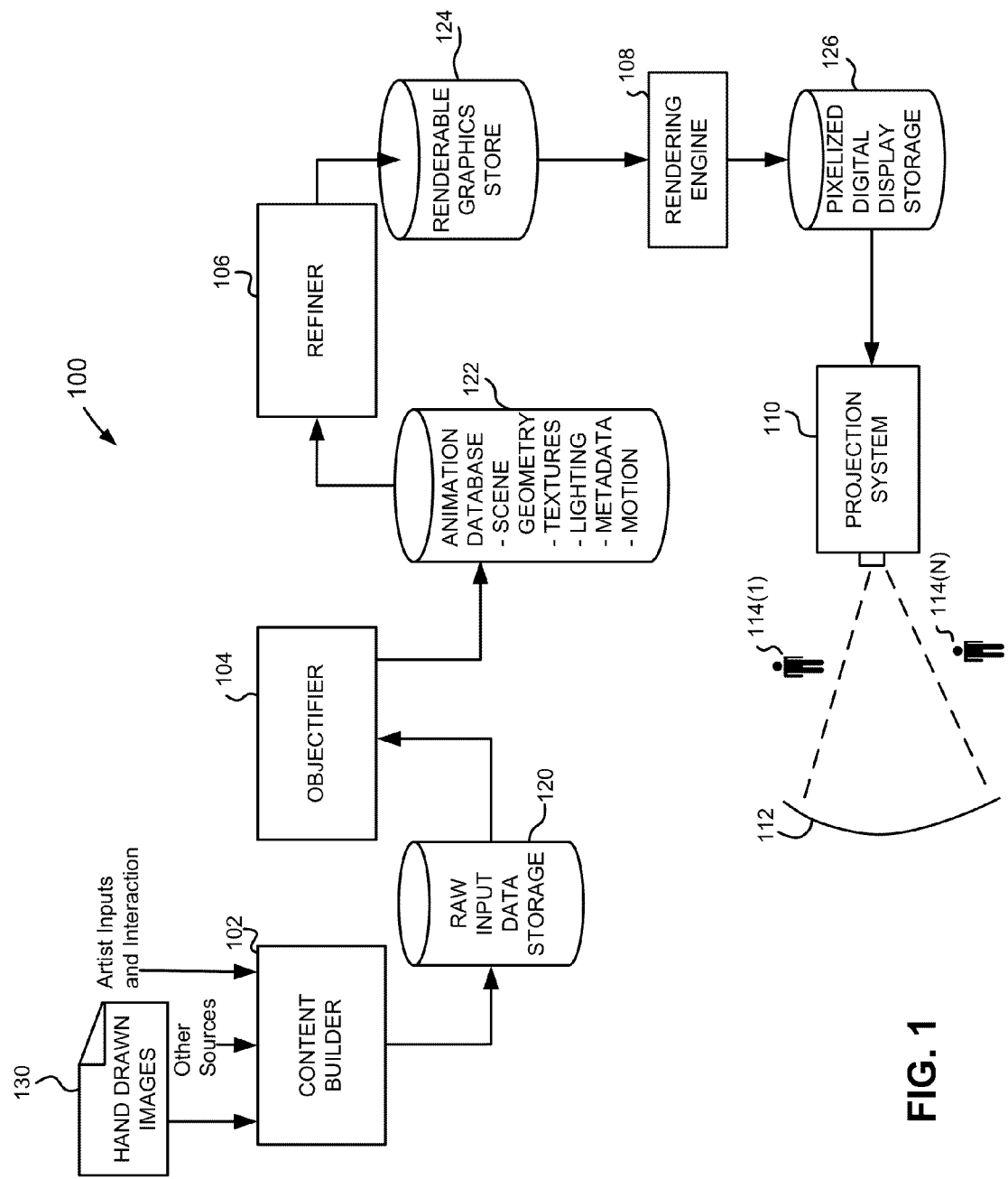
FIG. 1 illustrates a video system according to embodiments of the present invention.

An improved animation management system, methods, apparatus and program code are described herein. In this animation management system, motion effects programs generate pixel contributions for objects where the contributions for a given frame at a given time might be from more than one time or a time range. A compositor for a renderer can simply combine contributions from objects as they are in a particular instant in time that corresponds to the frame time being rendered with the shading provided by the motion effects programs, which reflect different contributions of the objects over time at given pixel locations.

When it comes to motion in 3D animations, motion is primarily conveyed by the actual movement of virtual objects on the screen and relative to each other. Along with this movement, however, there are a number of secondary effects that can be used to improve or enhance the way an observer understands the motion. Improvement is desirable when technical or physical limitations cause artifacts for the observer. The most obvious example for this is motion blur. However, the director of an animation might also want to artificially enhance (for example exaggerate) the way motion is perceived. Such effects can be achieved in numerous ways, which include changes in the animation itself, changes in the geometry of the animated objects, changes in the way objects are rendered, or additional visual effects.

Although animation is one of the most compelling aspects of computer graphics, little attention has been directed toward depicting the movement that makes dynamic scenes so exciting. Rendering motion is considered a non-issue and ignored or it might be handled by modeling the physics of traditional cameras to create motion blur. As described herein, artist tools are provided to allow for entry into animation of non-physics based motion suggestions. In one approach, a representation called a "time aggregate object" ("TAO") is generated and encodes an object's movement throughout time. In a specific implementation, the TAO is a triangle mesh so that global motion information can be efficiently incorporated into the rendering process. Different tools might allow for different motion suggestion styles, such as providing motion shaders for speed lines, multiple stroboscopic images, stylized blurring, stylized "streaks," multiple distinct exposures, and other motion suggestion. The contributions from each of these motion effects programs and standard surface shaders can be combined to form an image of objects and motion effects.

While objects might be described as moving, in a computer graphics representation, it means that the representation of the object changes position from frame to frame, for some number of frames. A motion effect or suggestion is the result of something other than the objects at their locations at a particular instant in time. For example, a motion effect might be a fading motion blur, wherein a frame includes illumination of a given pixel using light from an object that has already passed the pixel (or has not yet reached the pixel), with the contribution at a particular pixel being a function of the length of time between the current frame time and the time at which the object passed (or will pass) under the pixel. A simple example is a ball as a moving object and several seed points on the ball being the basis for speed lines tracking the movement of those seed points over a time period.

The TAO aggregates an object's movement into a single geometric representation in a particular embodiment. The object's movement can be sampled so that multiple copies of the object at different time instances are collected together in the TAO. The time associated with each sample is assigned to each vertex of the added object in the aggregate. Then, for each pair of added objects in the aggregate, a polygon is added that connects each edge in the first with the corresponding edge in the second. The polygon might be a bilinear patch. With this structure, a ray/intersection test with every polygon in the TAO gives a list of intersections that samples the path on the object's surface that has passed in front of the given pixel.

Several examples of motion depiction and effects techniques are described herein, but the invention need not be limited to the specific examples. Examples of motion effects include photographic blur that simulates or approximates effect of finite shutter speeds, speed lines, multiple stroboscopic images, shearing, time shifting, and dynamic balance. Unlike the limitations of existing motion-blur algorithms, the methods herein are more flexible. For example, motion need not be interpreted from a scene-wide integration over a fixed shutter time. The notion of a fixed shutter time can be relaxed to empower an artist to direct individual motion effect programs to determine the time range over which to operate. In this way, a single rendered image may combine information from a variety of different time ranges, such as two or more frame times or interframe times. Additionally, multiple motion effects can overlap.

Using the methods and apparatus described herein, an open-ended system for authoring motion effects as part of the rendering process can be created. In some sense, this is analogous to programmable surface shading taking the temporal domain into account for pixel coloring. While the motion effect programs might define how this extra dimension should be treated for a certain effect, they can still call upon conventional surface shaders for the computation of surface luminance at a given instant in time.

Hardware for Implementing Video System

FIG. 1 illustrates a video system 100 for creating, modifying and presenting animation, comprising a content builder 102, an objectifier 104, a refiner 106, a rendering engine 108, a projection system 110 and a screen 112 on which the animation is projected for viewers 114. It should be understand that some of these elements can be implemented in software, hardware or a combination of hardware and software. The software could be separate modules or a larger system having several functions. Also, one or more of these elements could include (often not shown) memory, inputs, outputs, input devices and output devices for human, computer or electronic interfaces. It should be apparent from a reading of this description, that many of these elements can be implemented as a general purpose computer executing program code, while accepting inputs and issuing outputs and storing, reading and writing to memory allocated to that program code.

In the embodiment shown in FIG. 1, content builder 102 receives various inputs and generates raw input data, which is shown being stored in storage 120. Examples of inputs are hand-drawn images 130, artist inputs and interactions and other sources. The raw input data might include digitized images, entries by an artist to indicate how objects would behave, motion capture data, instructions, metadata, etc.

Objectifier 104 processes the raw input data to construct representative objects, i.e., data structures that represent images in object form. For example, if raw data included a scan of a hand-drawn image of a sphere, two characters and some line art, the raw data might comprise arrays of pixel values as derived from a scanner output. Objectifier 104 would process this raw data to identify the shape, locations, textures, etc. of the virtual objects represented by those pixels and store into an animation database 122 object descriptions (although in some cases, the objects might be described solely by pixel values (colors) of pixels in a pixel array. Objectifier 104 might "vectorize" pixel values to identify lines from images, a 3D modeler to identify shapes and structures from input data, a graph generator that calculates the likely connections between different objects. The resulting graph might, for example, be useful for determining animations and indicating which objects need to stay connected to what other objects or when multiple objects are subparts of a larger object structure. Objectifier 104 might also include a user interface, to allow for artists to provide inputs to an objectification process and/or provide manual corrections to the results.

In one embodiment, animation database 122 includes a collection of object descriptions (the scene geometry, 3D objects, 2D strokes), textures, lighting, motion information, such as paths that objects take over a series of frames. For example, the animation database might include storage for a collection of objects that are parts of a character and storage for motion information describing how each of those objects moves from frame to frame. In an extremely simple case, the animation database might indicate that the scene geometry includes a textured, static background, a blue cube having an edge length of 4 units of length in the virtual space, and motion data to indicate that the cube does not rotate but translates 2 units up and 1 unit to the left for three frames, then stops and drops with a specified rotation for the next 10 frames. In a much more complicated case, the animation database includes all of the objects needed to describe a scene outside a French bistro, with two characters (made up of thousands of body elements) sitting at a table and carrying on a conversation. Additionally, animation database 112 might include metadata not about the scenes to be generated, per se, but information about how the other data was generated and/or edited, for use in subsequent processing steps and/or editing steps. The animation database might be implemented in any manner of data structure and/or storage, and need not be stored in a highly-structured database management system, so long as the animation data is electronically readable.

Refiner 106 processes data from animation database 122 to refine the animation. For example, refiner 106 might include a module for determining occlusions (where one object obscures another, which is useful information when animating the front object moving away so as to show more of the back object, or where two separate regions of a view are part of the same object, but obscured by one or more front objects), a module for filling in details, such as inserting information for generating inbetween frames based on key frame information contained in animation database 112. Refiner 106 might also include a module for display compensation.

Display compensation might be done for concave screens (to compensate for screen-to-screen reflections not dealt with for flat screens), for stereoscopic presentations (to compensate for ghosting from the image bound for one eye onto the image bound for the other eye) and other display compensation. Thus, refiner 106 might have inputs for screen parameters, as well as storage for screen parameters, artist inputs, technician inputs, and the like, as might be useful for refining an animation.

The output of refiner 106 is to a store 124 for renderable graphics data. It may be in some embodiments, that animation database 112 is used for pre-refined animation and post-refined animation. Either way, rendering engine 108 can take the renderable graphics data and output pixelized digital display data that is stored in storage 126. Rendering engine 108 can run in real-time or not. The pixelized digital display can be in a raw form, such as a 2D pixel array with dimensions specified by a maximum resolution (e.g., 1920×1280, 1280× 720), with each element of the array representing a pixel color value (often three or four "component" values). The pixelized digital display data might also be compressed, but the storage format need not be detailed here.

The pixelized digital display data is readable by projection system 110, which then projects the image sequences for viewing. It may be that the pixelized digital display data includes more than just arrays of pixel values, as it might include other data useful to the projection system, such as some of the data used in processing, assumptions about the screen, etc. Also, projection system 110 might also be provided with one or more synchronized audio tracks. In many cases, an animation is created by one entity, such as a film-maker and the pixelized digital display data is distributed to a presenter in the form of digital transmission, storage on medium and transported to the presenter, such as a theater proprietor, DVDs transported and sold to end customers for small-scale viewing, medium provided to broadcasters, etc. As such, the generation of the animation might be done by one party independently of what a recipient of the medium and/or transmission does for the presentation. However, the animation process might be informed by actual or presumed details of how the presentation is to occur. As one example, the compensation might vary for varying projectors. As another example, the resolution and color depth might vary at the rendering engine (and/or elsewhere) based on formats used by presenters (such as DVD formats, vs. standard broadcast format, vs. theatre presentation).

Also the animation path, artist inputs can be accommodated. "Artist" can refer to any user that provides input, such as a graphic artist, an animator, a director, a cinematographer, their assistants, etc. Different skill levels can be accommodated. For example, not many animation skills are needed to input scanned drawings, but more skills are needed to provide inputs to the look of a particular key frame.

Figure 2:
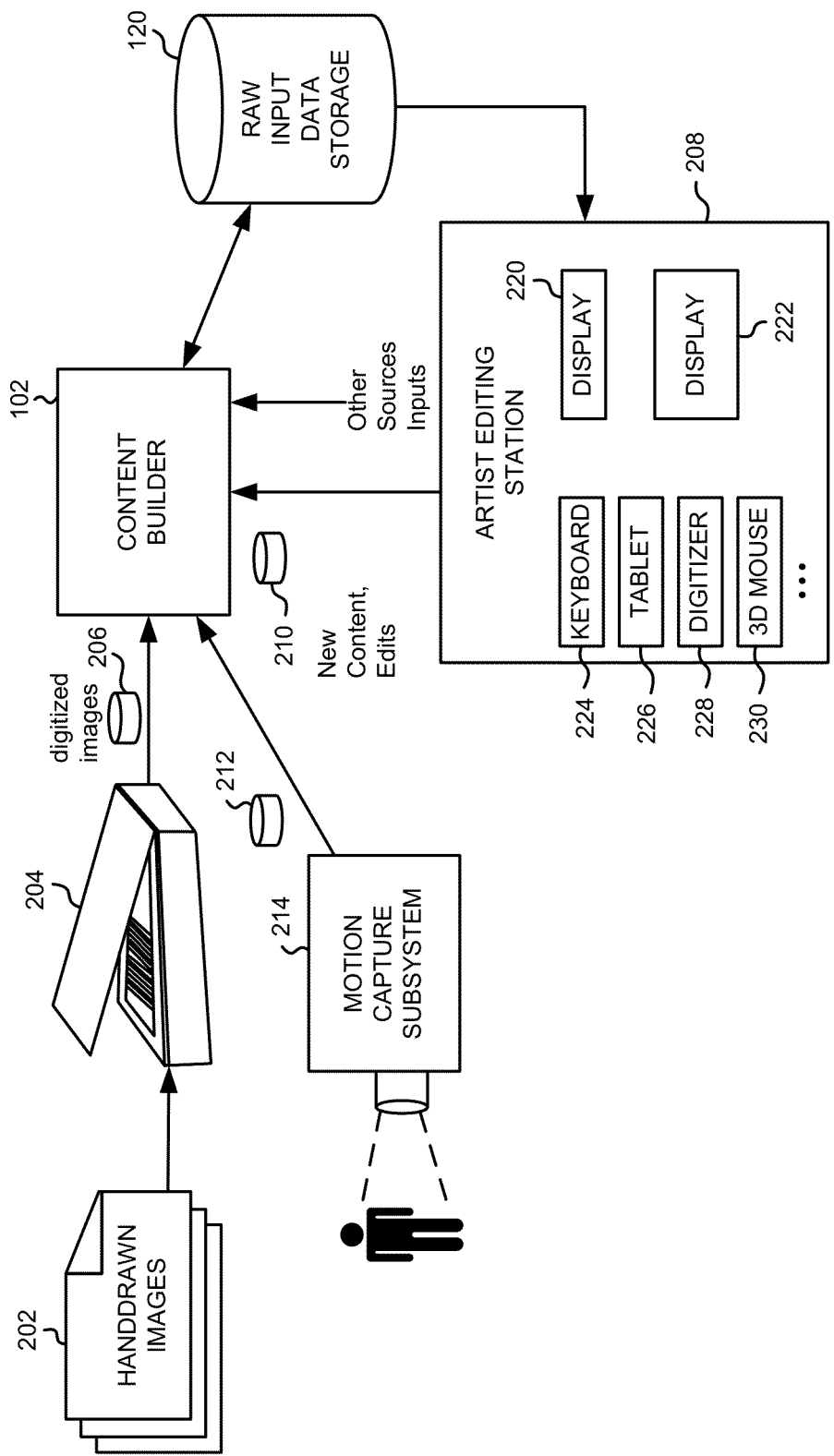
FIG. 2 illustrates elements of video system in more detail.

FIG. 2 illustrates elements of video system 100 in more detail. In the examples shown there, content builder 102 receives digitized images 206 from a scanner 204 when scanning hand-drawn images 202. Content builder 102 can also receive new content and edits to existing content as inputs 210 from an artist editing station 208, as well as motion capture data 212 from a motion capture subsystem 214. As illustrated, artist editing station 208 includes a keyboard 224, a tablet 226, a digitizer 228, a 3D mouse 230, a display generator 220 and a display 222. Using artist editing station 208, an artist can view the raw input data and make changes to the inputs. Artist editing station 208 might also be configured to allow for artist editing of the raw input data directly, but usually it is more convenient and/or intuitive to allow the artist to modify the inputs. For example, rather presenting a display of what the raw data represents on display 222 and requiring the artist to modify the data structures in storage 120 that represent a motion capture data point when the artist determines that something doesn't look right, it might be preferred to provide the artist with tools to specify modifications to the motion capture process (add, delete points, recapture, etc.) and have content builder 102 rebuild the raw data. This frees the artist to make artistic changes at a higher level, while providing fine control and not requiring data management experience.

In operation, multiple artists and others might edit the data in multiple rounds until the acceptable raw data is achieved. In some embodiments, as explained below, an editing station might allow for multiple stages of editing.

Figure 3:
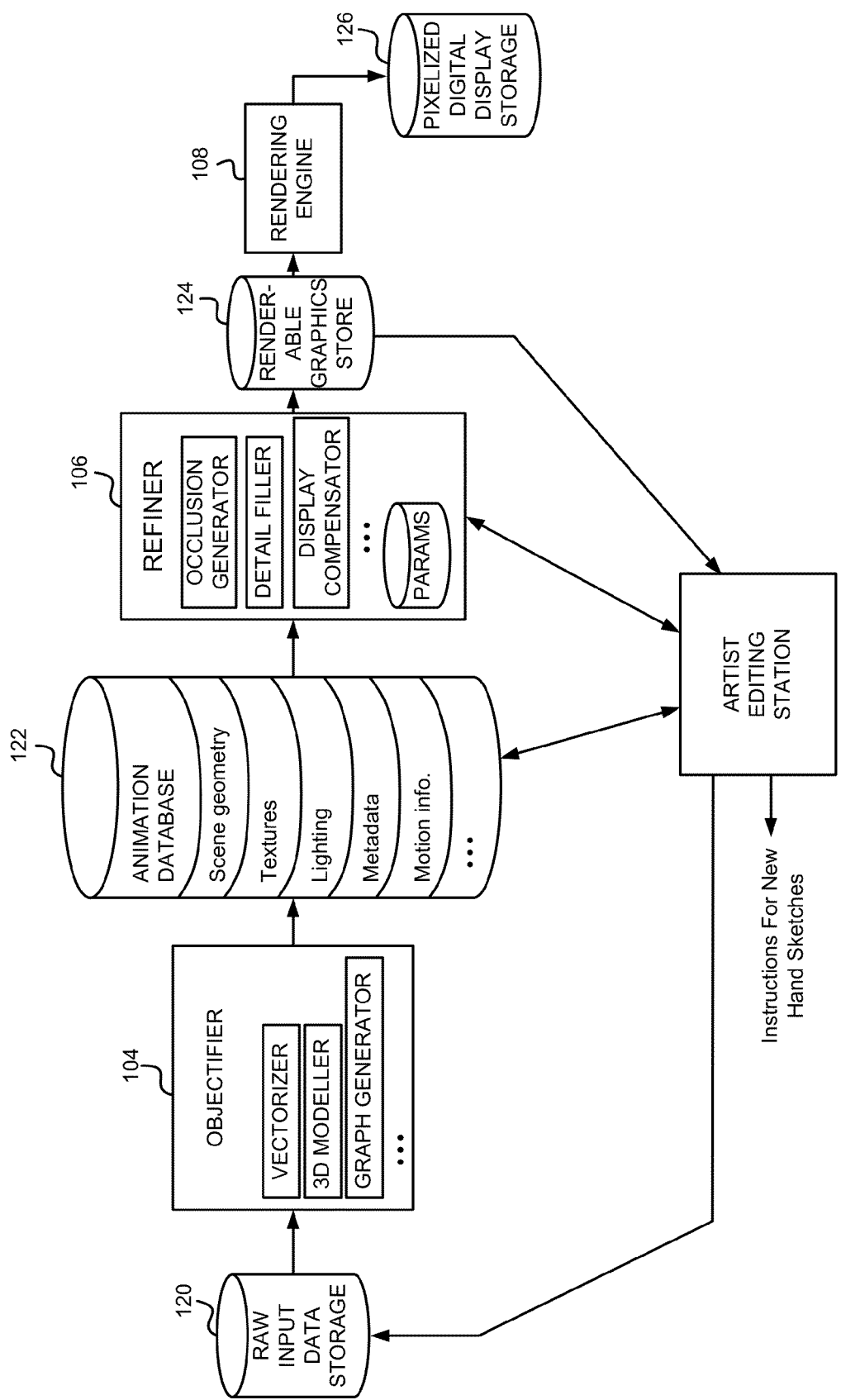
FIG. 3 illustrates elements of video system in other detail including an editing station.

FIG. 3 illustrates elements of video system 100 in other detail illustrating such as an editing station 300. As illustrated there, editing station 300 is coupled to raw input data storage 120 to write new raw input data (and could read), coupled to animation database 122 to read and write animation data, coupled to storage 124 to read renderable graphics, and coupled to read and write parameters for refiner 106. As illustrated, objectifier 104 processes the raw input data to populate animation database 122, refiner 106 refines the (at least some of the) contents of animation database 122 and outputs it as renderable graphics, which rendering engine 108 can produce as pixelized digital display data. Thus, in concept, an entire feature film can be specified by the contents of animation database 122, it can be rendered in whole or part, reviewed at an editing station and modified. Ideally, the tools provided at the editing station are suited to high-level editing and are intuitive with what the artists are providing. In some cases, the editing station might generate instructions for additional operations needed to obtain new or additional raw input data, such as additional hand-drawn sketches and additional motion capture or CGI processing.

Figure 4:
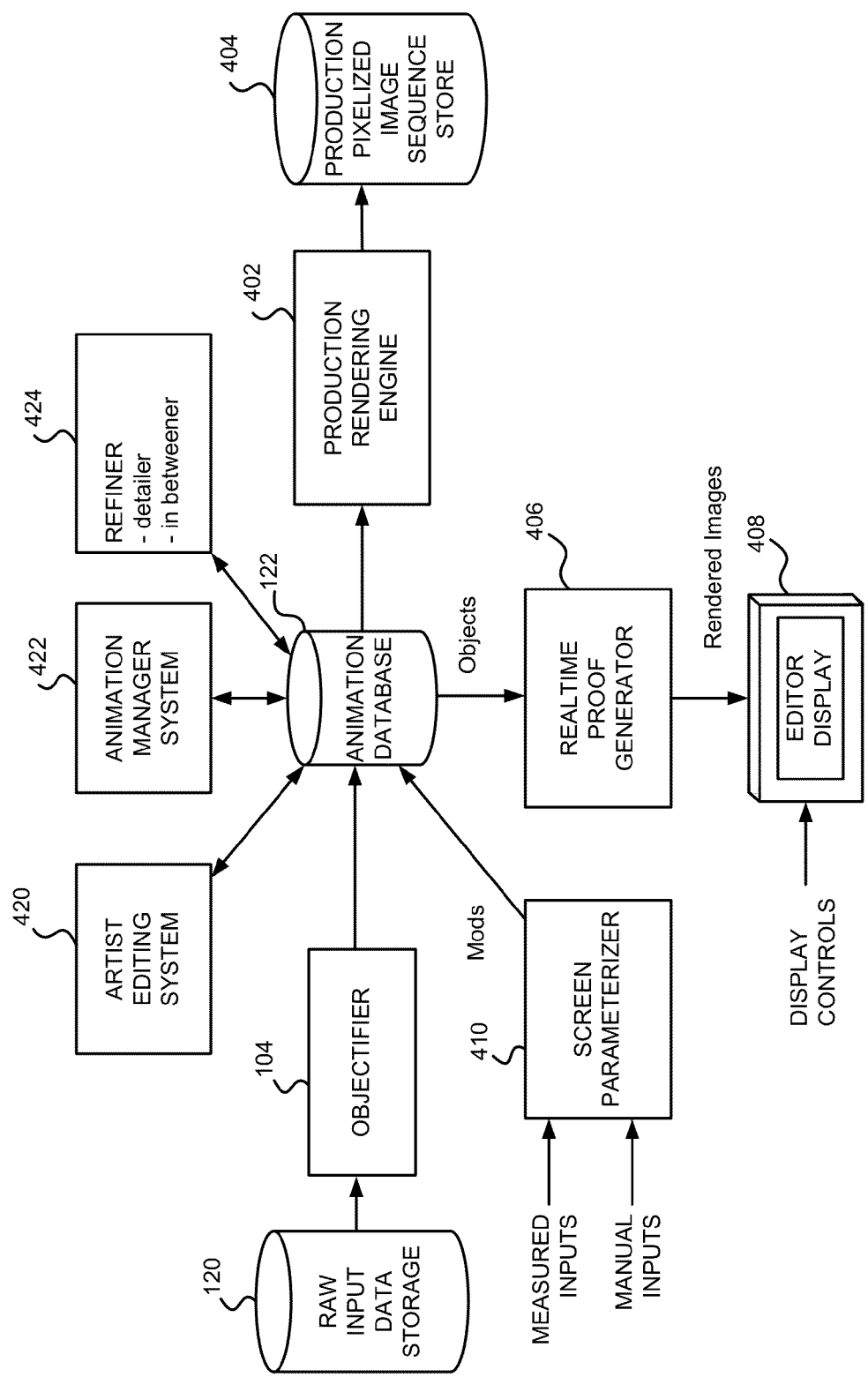
FIG. 4 illustrates a variation wherein an animation database forms central storage for various processing and edits.

FIG. 4 illustrates a variation wherein the animation database forms the central storage for various processing and edits. As illustrated there, raw input data from storage 120 is read by objectifier 104 and written to animation database 122, as in the previous example. However, the various editors edit to animation database 122, which can then be the source for a production rendering engine 402 that renders production-quality and writes to production pixelized image sequence store 404, as well as the source for real-time proof generator 406 (which can be a lower resolution and/or quality renderer) that outputs rendered images to an editor display 408. As illustrated there, animation database 122 might receive screen information from a screen parameterizer 410 that determines, from measured inputs and/or manual inputs, parameters about the screen for which the rendering is to occur—such as its distance from the projector lens, its radius of curvature, the cross-over illumination from one stereoscopic image to another (such as cross-pollution of polarized images). Other changes can come from an artist editing system 420, an animation manager system 442, and/or a refiner 424. Artist inputs might be converted to raw input data, but typically enough information would be available to generate objects from the artist inputs.

Figure 5:
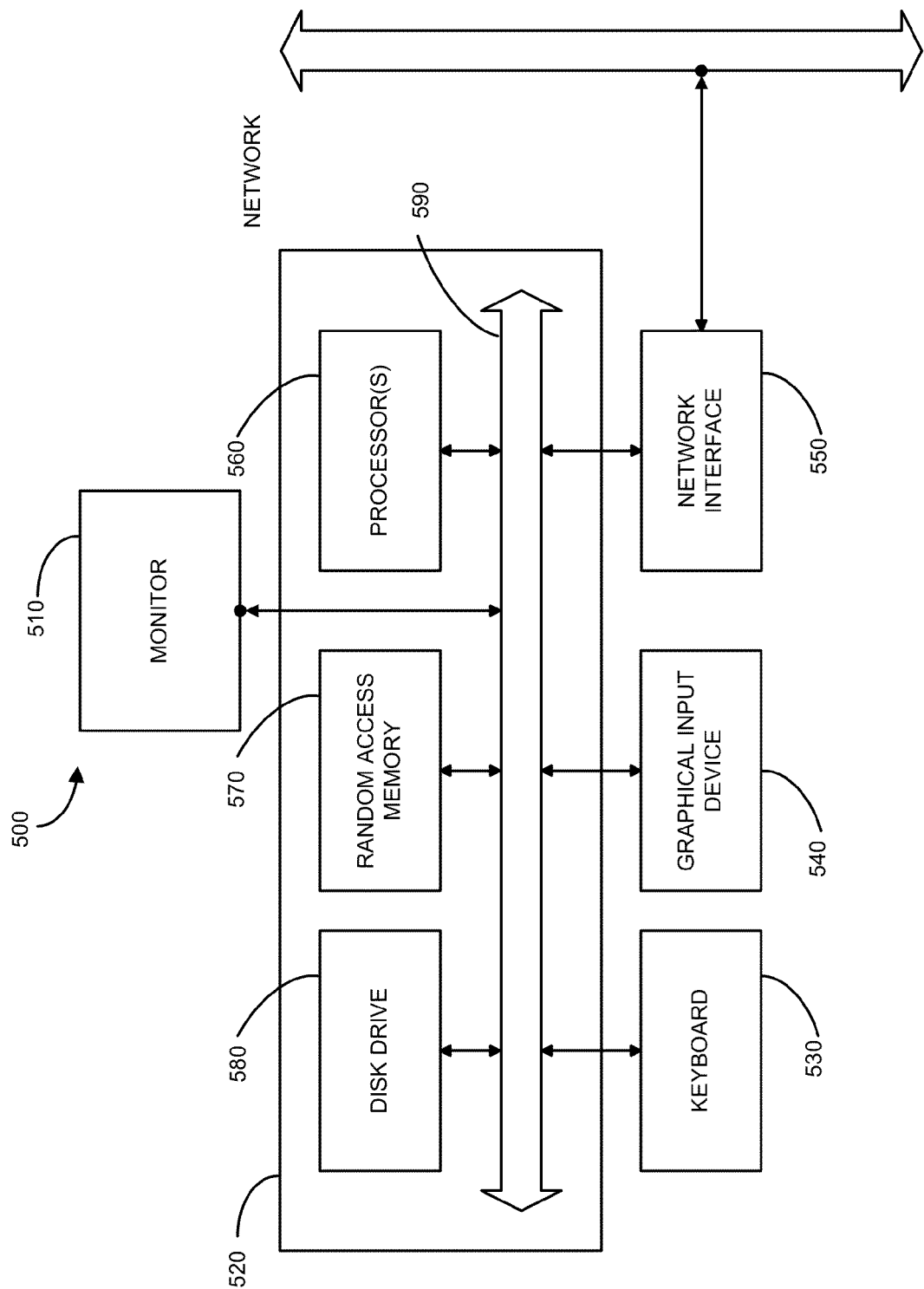
FIG. 5 illustrates an example artist editing system usable for animation management according to an embodiment of the present invention.

FIG. 5 illustrates an example artist editing system 500 usable for animation management according to an embodiment of the present invention. In the presently described embodiment, artist editing system 500 typically includes a display/monitor 510, computer 520, a keyboard 530, a user input device 540, computer interfaces 550, and the like. Images can be input using a scanner (not shown), received over a network or other interface, stored in memory or hard disk storage, or drawn directly into the system where such functionality is provided and/or obtained from a data storage device depicted elsewhere. The interfaces and/or memory might also be used to provide the metadata about images, animation sequences and the like.

In various embodiments, display/monitor 510 may be embodied as a CRT display, an LCD display, a plasma display, a direct projection or rear projection DLP, a microdisplay, or the like. In various embodiments, monitor 510 may be used to visually display user interfaces, images, or the like as well as being part of an interactive environment that accepts artist inputs, shows results of animation generation and metadata, etc. and accepts further input.

In the present embodiment, user input device 540 is typically embodied as a computer mouse, a trackball, a track pad, a joystick, wireless remote, drawing tablet, voice command system, eye tracking system, and the like. User input device 540 typically allows a user to select objects, icons, text and the like that appear on the display/monitor 510 via a command such as a click of a button or the like as well as making moving inputs, such as signaling a curve or association of objects, drawing lines, etc.

Embodiments of computer interfaces 550 typically include an Ethernet card, a modem (telephone, satellite, cable, ISDN), (asynchronous) digital subscriber line (DSL) unit, FireWire interface, USB interface, and the like. For example, computer interfaces 550 may be coupled to a computer network, to a FireWire bus, or the like. In other embodiments, computer interfaces 550 may be physically integrated on the motherboard of computer 520 and/or include software drivers, or the like.

In various embodiments, computer 520 typically includes familiar computer components such as a processor 560, and memory storage devices, such as a random access memory (RAM) 570, disk drives 580, and system bus 590 interconnecting the above components. RAM 570 or other memory might hold computer instructions to be executed by one or more processors as a mechanism for effecting some functionality described herein that is implemented in software. In one embodiment, computer 520 includes one or more Core™ microprocessors from Intel. Further, in the present embodiment, computer 520 typically includes a UNIX-based operating system.

RAM 570 and disk drive 580 are examples of computer readable tangible media configured to store embodiments of the present invention including computer executable code implementing techniques described herein, data such as image files, object/scene models including geometric descriptions of objects, images, metadata about images and user inputs and suggestions, procedural descriptions, a rendering engine, executable computer code, and/or the like. Other types of tangible media may include magnetic storage media such as floppy disks, networked hard disks, or removable hard disks, optical storage media such as CD ROMS, DVDs, holographic memories, and/or bar codes, semiconductor memories such as flash memories, read only memories (ROMS), battery backed volatile memories, networked storage devices, and the like.

In various embodiments, artist editing system 500 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, a graphical processor unit or "GPU", may be used to accelerate various operations.

FIG. 5 is representative of a computer system capable of embodying the present invention. It will be readily apparent to one of ordinary skill in the art that many other hardware and software configurations are suitable for use with the present invention. For example, the computer may be a desktop, portable, rack mounted or tablet configuration. Additionally, the computer may be a series of networked computers. Further, the use of other micro processors are contemplated, such as Xeon™, Pentium™ or Itanium™ microprocessors from Intel; Turion™ 64 or Opteron™ microprocessors from Advanced Micro Devices, Inc; and the like. Further, other types of operating systems are contemplated, such as Vista™ or Windows XP™ or the like from Microsoft Corporation, Solaris™ from Sun Microsystems, Linux, Unix, or the like. In still other embodiments, the techniques described above may be implemented upon a chip or an auxiliary processing board. Many types of configurations for computational devices can be used to implement various methods described herein. Further, processing components having different levels of computational power, e.g., microprocessors, graphics processors, RISC processors, embedded processors, or the like can also be used to implement various embodiments.

Motion Effect Programs

Many stylized motion effects from traditional mediums summarize an object's movement over a continuous range of time with transient, ephemeral visuals that are left behind. To capture this without requiring extensive manual operations, a motion effects program according to the present invention might operate on a scene configuration during an arbitrarily long time range T.

In analogy to a state-of-the-art renderer that relies on surface shaders to determine the color contributions of visible objects to each pixel, here the computation of a moving object's color contribution within the time range T is performed by a "motion effect program", that can be implemented in hardware, software or both. A motion effect program is provided with which portions of all surfaces have been "seen" through a pixel during time range T. In general, this area is the intersection of the pyramid extending from the eye location through the pixel corners with the objects in the scene over time. In some embodiments, the surface area seen by the pixel for a particular object is represented by a line along the surface of the object, which is referred to as a "trace" herein. The spatial aliasing incurred by this simplification can be addressed via supersampling in the spatial domain.

A motion effect program calculates a trace's contribution to the final pixel color. In doing so, it utilizes both positional information (the location of a trace on the object's surface) and temporal information (the time a given position was seen) associated with the trace. It can evaluate the object's surface shaders as needed and draw upon additional scene information, such as the object's mesh data (vertex positions, normals, texture coordinates, etc.), auxiliary textures, the camera view vector, and vertex velocity vectors.

Time Aggregate Objects

Computing a trace is a four-dimensional problem in space and time, where intersecting the 4D representation of a moving object with the plane defined by the view ray yields the exact trace. Unfortunately, since the influence of the underlying animation mechanics on an object's geometry can be arbitrarily complex, a closed-form analytic solution can be infeasible. Monte Carlo sampling sometimes doesn't work well, since the time period associated with a trace may be very short in comparison to the time range over which the motion effect is active. For example, a ball may shoot past a pixel in a fraction of a second but leave a trailing effect that persists for several seconds. A huge number of samples distributed in time would be required in order to effectively sample the short moment during which the ball passes.

The object's geometry sampled at a set of times $t_i$ into a single geometric primitive and corresponding edges of adjacent samples are connected by a bilinear patch, which is the surface ruled by the edge as its vertices are interpolated linearly between $t_i$ and $t_{i+1}$. This forms what is referred to herein as a "time aggregate object" or "TAO" that is the union of the sampled object geometry and swept edges.

The intersection of a view ray with a bilinear patch of the TAO represents a time and location where the ray, and thus also a trace, has crossed an edge of the mesh. By computing all such intersections (not just the closest one) and connecting the associated edge crossings with line segments, the motion effect program obtains a linear approximation of the trace. Intersections with the sampled geometry represent additional time and space coordinates, which improve the accuracy of the trace approximation.

The accuracy of the approximated traces thus depends on the number of TAO intersections, which scales with both the geometric complexity of the object's geometry and the number of samples used for aggregation. In practice, embodiments can use finely sampled TAOs without a prohibitive computation time, since the complexity of ray-intersection tests scales sub-linearly with the number of primitives when appropriate spatial acceleration structures are used.

In some embodiments, the TAO is implemented as a custom data structure. It is a piece-wise linear approximation (in time) of the swept surface of any object with motion effects applied. Where the input objects are triangle meshes with static topology, the needed data per interpolation node is limited to the per-vertex time dependent information, such as vertex positions, normals, and texture coordinates. This data can be retrieved by sampling the geometry at interpolation nodes.

Compositing for Multiple Motion Effects

A motion effect program acts on a trace as a whole, which may span a range of depths and times. If objects and contributions from their associated programmable motion effects are well separated in depth, the renderer can composite each effect's total contribution to the image independently according to depth ordering. The compositing algorithm used can be defined by the effect itself. Compositing becomes more complex when multiple traces overlap, since there may be no unequivocal ordering in depth or time. Additionally, different motion effect programs may operate over different, but overlapping, time domains since a single scene-wide shutter time is not enforced. However, in some embodiments, that is dealt with by introducing additional structure to the way in which motion effects operate. All traces are resampled at a fixed scene-wide resolution. Each motion effect program processes its traces' samples individually, and outputs a color and coverage value if that sample should contribute luminance to the rendered pixel. The compositor just processes the output samples in front-to-back order, accumulating pixel color according to the coverage values until 100% coverage is reached.

Hardware for Generating TAOs and Using Them

Figure 6:
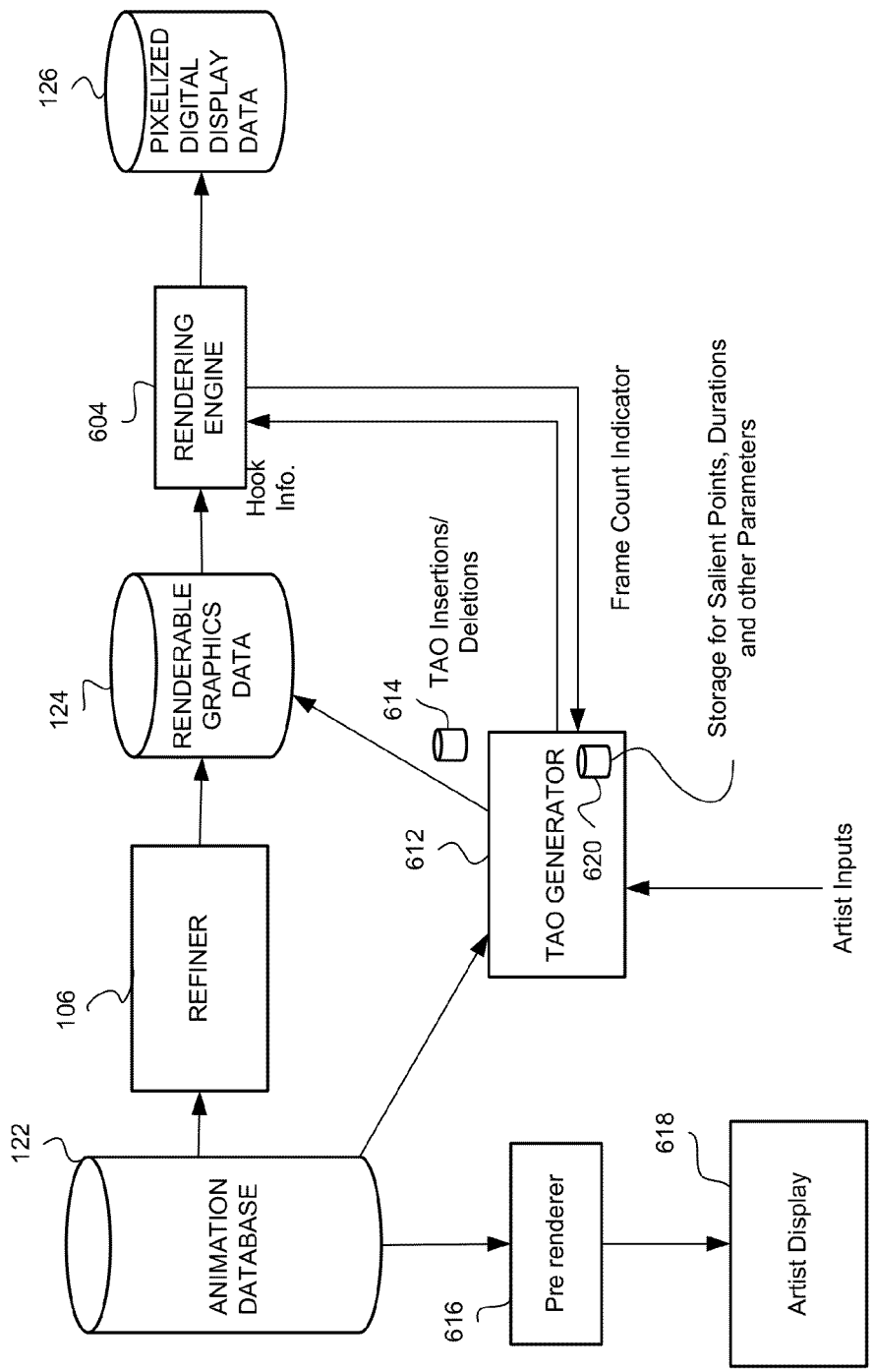
FIG. 6 illustrates a system for generating time-aggregate objects.

FIG. 6 illustrates a system 600 for generating TAOs. In a specific implementation, the TAOs are generated by a plug-in to Autodesk™ Maya™ 2010, but other rendering engines could be used instead. The plug-in reproduces the core rendering functionality, but uses Maya shading networks for surface shading. It is divided into two parts: a Maya Dependency Graph node, which generates and encapsulates the TAO (as a spatio-temporal data structure), and a Maya command, which implements the actual rendering process.

The rendering engine can compute a color for each pixel independently by computing intersections of the pixel's view ray with the TAOs, and connecting them to form a set of traces. Then it might call the motion effect programs for each object, which compute that object's and effect's contribution to the pixel color using the object's traces. Finally, a compositing step computes the resulting pixel color.

As illustrated, an artist display 618 is provided to show the artist the results of prerendering (using prerenderer 616) of animations in animation database 122 and a TAO generator 612 can generate TAOs from animation database 122 informed by stored values 620 and provided to the rendering engine.

Figure 7:
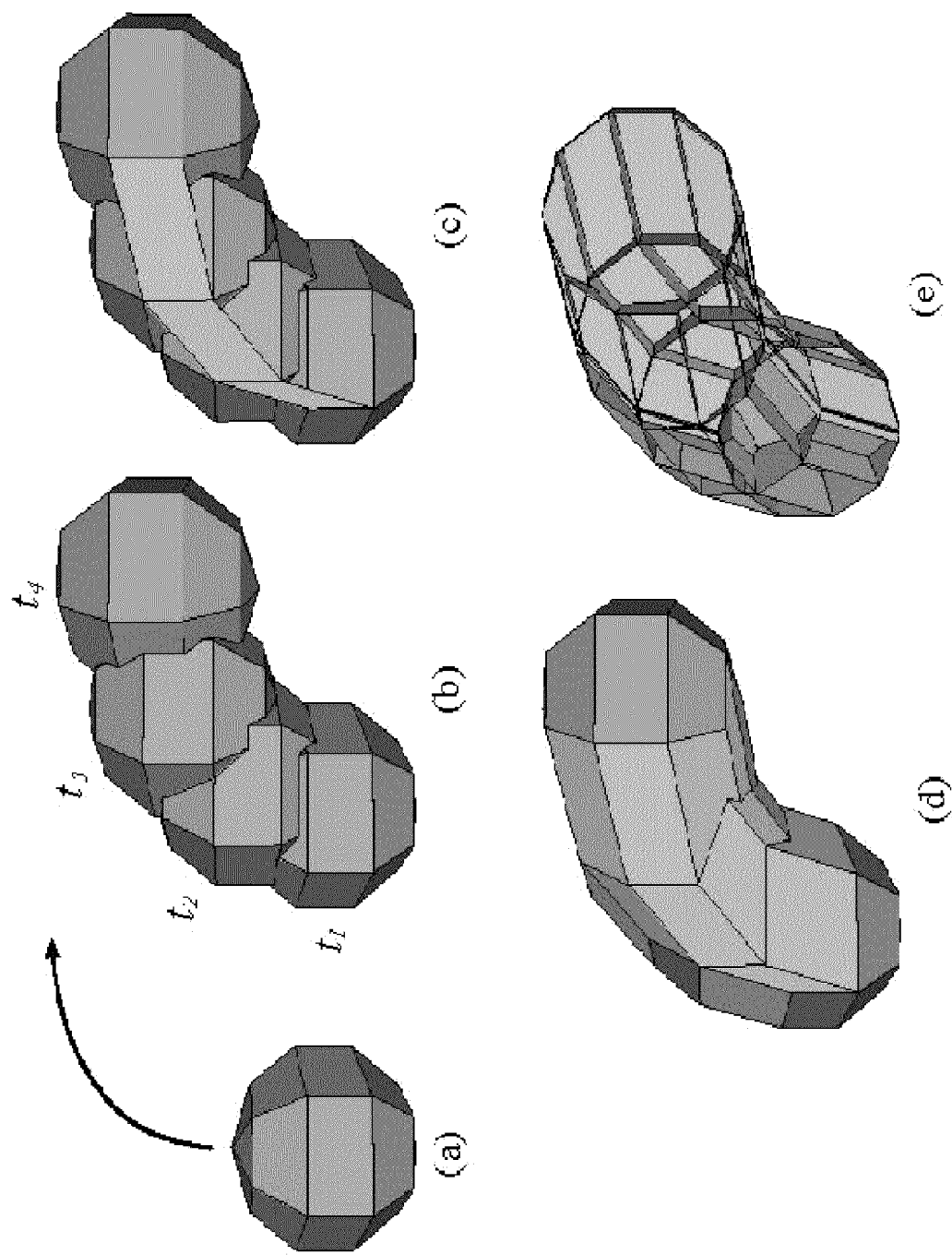
FIG. 7 is an illustration of a logical representation of a time-aggregate object.

FIG. 7 is an illustration of a logical representation of a time-aggregate object. FIG. 7(a) shows the object at the start of its movement (as far as this example is concerned) and an arrow indicating the path of motion. FIG. 7(b) shows the time aggregate object (TAO) representing the object of FIG. 7(a) and its motion, where the object is sampled at four different times, $t_1$, $t_2$, $t_3$, and $t_4$. Next, bilinear patches that connect corresponding edges in adjacent sample's edges are added, as illustrated in FIG. 7(c) (which shows the patches for just one edge). FIG. 7(d) shows the patches for the whole mesh. This TAO data structure is not just the convex hull of the moving object, but has a complex inner structure, as seen in the cutaway image of FIG. 7(e).

Conceptually, the TAO data structure comprises two different types of primitives: the copies of the triangles of the input mesh at each interpolation node, and the ruled surface generated by each edge of the mesh as it moves from one interpolation node to the next. When the plug-in interpolates the vertex positions linearly between interpolation nodes, the ruled edges form bilinear patches. For an input mesh with $N_V$ vertices, $N_E$ edges, and $N_F$ triangles, and an approximation with $N_t$ interpolation nodes, the TAO represents $N_t \cdot N_F$ triangles and $(N_t-1) \cdot N_E$ bilinear patches.

The density and placement of interpolation nodes determines how well the motion of an object is approximated by the data structure. Since the approximation is of linear nature, it perfectly captures linear motion. For rotation and non-rigid deformation, however, the sampling of the motion can vary the results. Uniform spacing is the simplest way to distribute the interpolation nodes. For animations with large variance in the motion, however, a uniform sampling distance might be defined by the most non-linear part of the animation, thus wasting resource consuming interpolation nodes in more linear regions. Therefore, a preferred implementation has a simple adaptive sampling strategy, starting with a uniform sampling and inserting or deleting interpolation nodes depending on the maximum non-linearity $\alpha_i$ between consequent vertex positions as described by Equation 1, where angle(A, B, C) is the angle between the line segments AB and BC and $v_j(t_i)$ is the position of vertex j at the time of the interpolation node i.

$$\alpha_i = \max_j \text{angle}(v_j(t_{i-1}), v_j(t_i), v_j(t_{i+1}))$$ (Eqn. 1)

In this implementation, interpolation nodes are iteratively removed, if $\alpha_i$ is smaller than a given coursing threshold. In a second step, two new interpolation nodes are added at the times indicated by Equation 2, if $\alpha_i$ exceeds the refinement threshold.

$$\frac{t_i - t_{i-1}}{2}, \frac{t_{i+1} - t_i}{2}$$ (Eqn. 2)

In order to keep the maximum number of interpolation nodes under control, the plug-in applies the refinement criterion iteratively on the interpolation with the largest $\alpha_i$ and stops refinement when the maximum number of interpolation nodes is reached. Assuming a certain coherence in the motion of nearby vertices, the optimal interpolation node placement can be approximated by only taking a subset of the mesh vertices into account in Equation 1.

TAO Generation and Use Process Example

Figure 8:
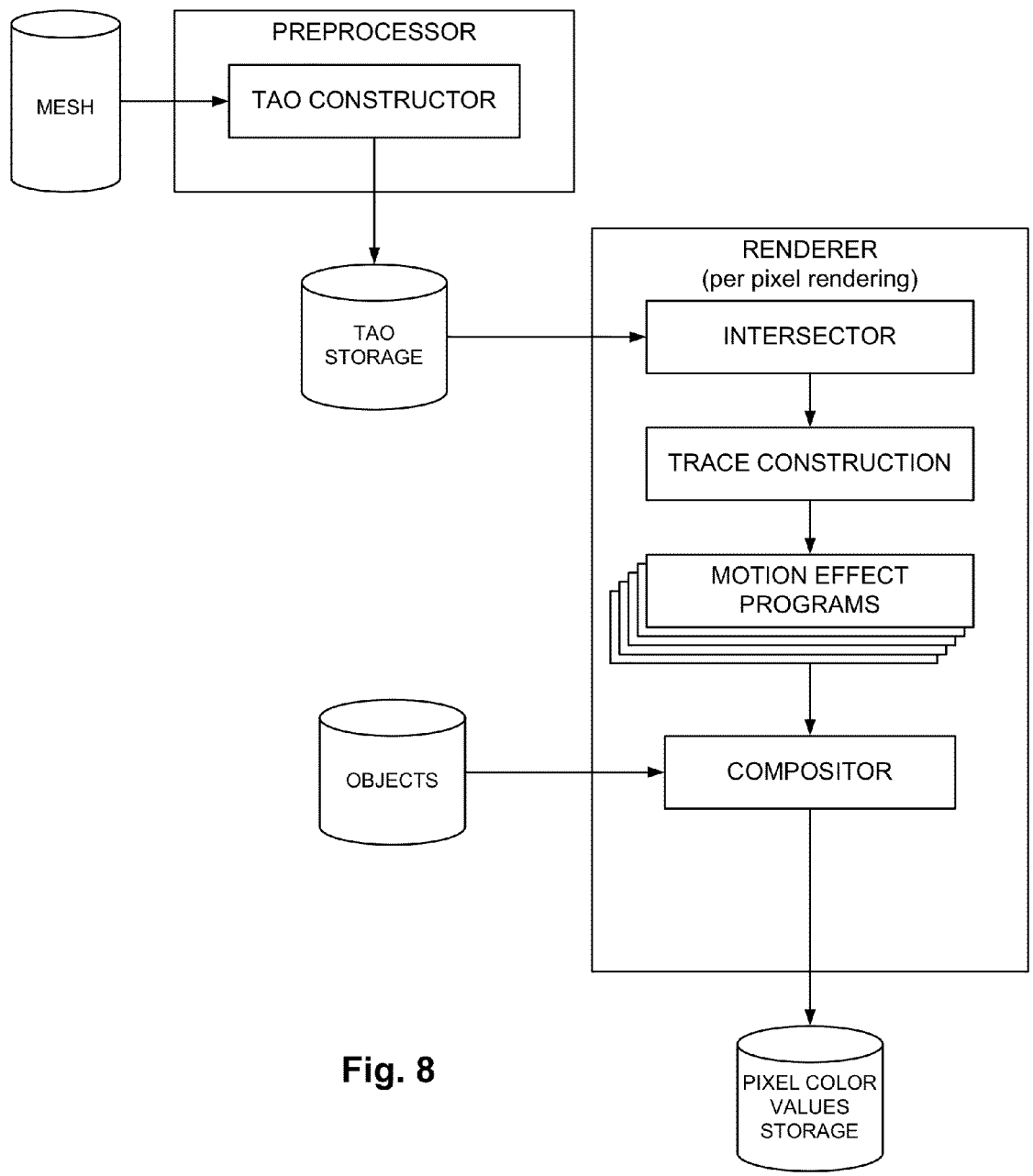
FIG. 8 illustrates a flowchart of a process of generating time-aggregate objects.

FIG. 8 illustrates a flowchart of a process of generating time-aggregate objects. Each section therein is described in more detail below. From a mesh, a TAO can be constructed in preprocessing. Then, per-pixel operations such as TAO intersection, trace construction, trace subsampling, shading, and compositing can be done to generate pixel colors for an image representing an image showing this scene with the scene geometry and be inserted motion suggestive features.

TAO Intersection

The actual rendering process can follow the standard ray-tracing approach on a high level, generating view rays for each pixel according to the camera transform. These rays are intersected with the primitives represented by the TAO (mesh faces and ruled edges). All intersections of a view ray can be kept with the TAO data structure, not just the one that is closest to the viewer. Normals, UV coordinates, and other surface properties are interpolated linearly over the primitives.

For the intersection with bilinear patches, the technique described in [Ramsey] can be used. If an edge connects $v_j$ and $v_k$, then for each $0 < i < N_i - 1$ a bilinear patch is defined as shown in Equation 3.

$$\rho_{ijk}(r,s) = (1-r)(1-s) \cdot v_j(t_i) + (1-r) \cdot s \cdot v_k(t_i) + r \cdot (1-s) \cdot v_j(t_{i+1}) + r \cdot s \cdot v_k(t_{i+1})$$ (Eqn. 3)

Solving for a ray intersection yields a set of patch parameters (r, s) that corresponds to the intersection point. In Equation 3, the TAO generator or motion effects program can use the parameter r to compute the time at which the ray has crossed the edge, as shown in Equation 4.

$$t = t_i + r \cdot (t_{i+1} - t_i)$$ (Eqn. 4)

The parameter s describes the position along the edge at which the crossing has happened. It can be used to interpolate surface properties stored at the vertices to the intersection point, and to compute the position of the intersection point in a reference configuration of the object. Mesh face primitives in the TAO can be intersected using standard intersection methods. A parametric representation of the intersection points with respect to the primitives can be used for interpolating the surface properties.

Trace Generation

The set of all intersection points of a ray with the TAO is used to reconstruct the locus of points traced by the ray on the moving object. In some embodiments, some intersection points might be omitted. The set of all intersection points can be determined by looking at the interpretation of the intersection points on the input mesh. As a triangle passes by the ray, the ray crosses the edges of the triangle an even number of times (assuming that the ray was outside at the beginning and at the end of the observed time). Each crossing corresponds to an intersection of the ray with a bilinear patch of the TAO, and vice versa. By restricting to a piecewise linear approximation of the motion, the trace forms a linear segment in between two edge crossings. The process of constructing the trace is thus equivalent to the process of connecting the intersection points in the right order.

A Time-Volume-Element (TVE) is a data structure representing the volume covered by a triangle swept between two interpolation nodes. This volume is delimited by the triangles at the border positions of the interpolation segment, and the three bilinear patches formed by the triangle's swept edges. Since there is an unambiguous notion of inside and outside, a ray starting outside of a TVE will always have an even number of intersections with the TVE, unless it exactly hits the TVE's boundary. A pair of consequent entry and exit points corresponds to a segment of the trace on the triangle. Therefore, by sorting all intersection points of a ray with a TVE according to their distance to the viewer and pairing them up sequentially, a trace generator can construct all trace segments that cross the corresponding triangle within the time range spanned by the TVE.

Figure 9:
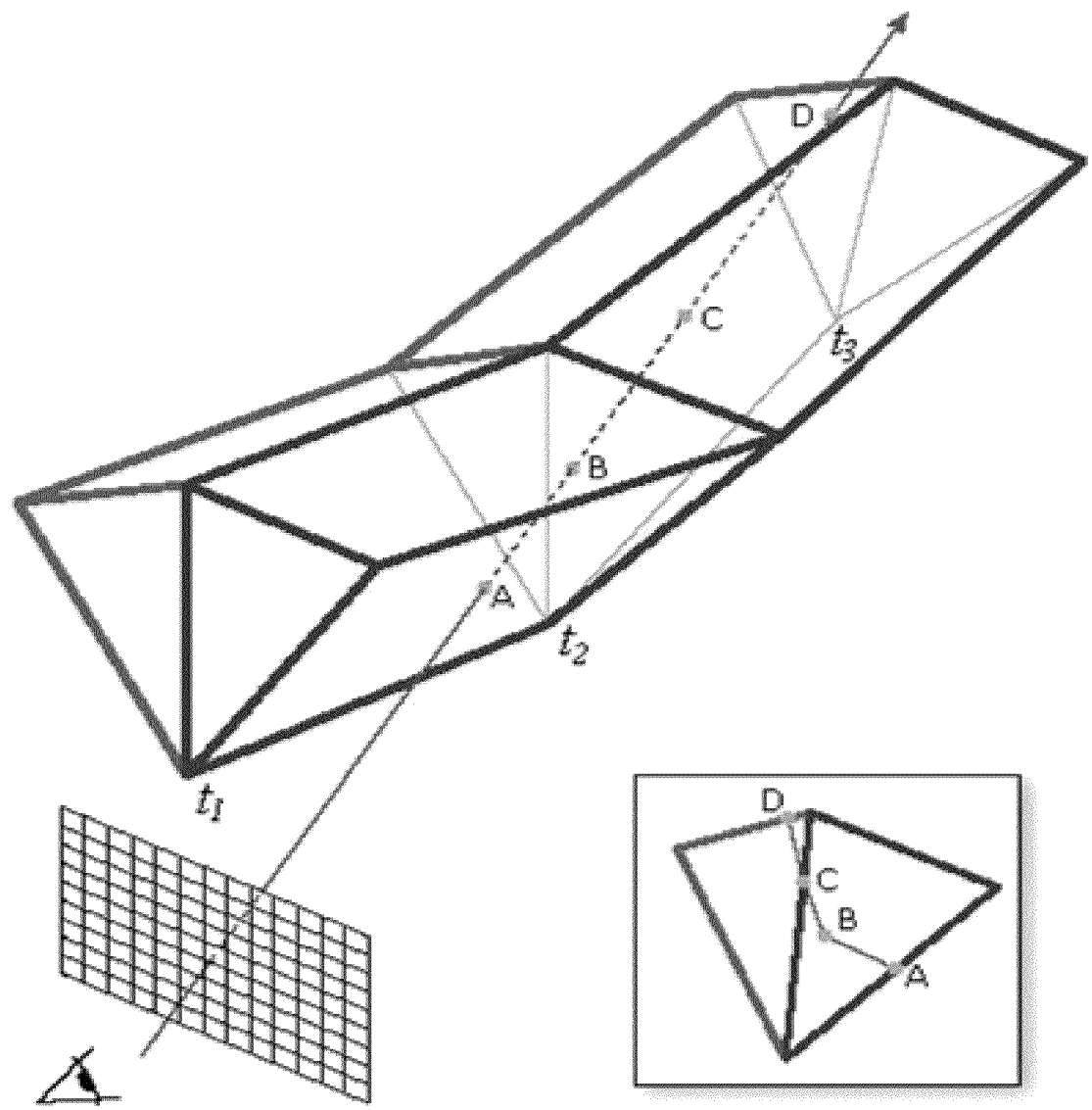
FIG. 9 illustrates an example of a Time-Volume-Element (TVE).

FIG. 9 illustrates an example of a TVE. The underlying object is two triangles, and three consecutive object samples, at $t_1$, $t_2$ and $t_3$, which results in four TVEs. The ray shown intersects the TVEs four times, at points labelled A, B, C, and D. At intersection A, the ray enters the rightmost triangle though an edge. Point B is an intersection with a sampled mesh triangle at $t_2$, indicating that the ray moves from one time sample to the next. At point C, the ray leaves the rightmost triangle and enters the leftmost triangle, which it finally exits at point D. The reconstructed trace visualized on the two triangles is shown in the inset box in FIG. 9.

TVEs are adjacent in space if they share a common primitive of the TAO. If the shared primitive is a triangle, the TVEs were formed by the same triangle of the input mesh in adjacent interpolation segments. If it is a bilinear patch, the triangles that formed the TVEs are adjacent on the input mesh, separated by the edge that formed the patch. This adjacency defines the connections between trace segments of individual TVEs. Since the trace segments are available from the previous step, the trace generator constructs connected components of the trace by using the TVE adjacency.

Trace Processing

Once the traces are generated, they can be processed further. The traces that the current pixel's view ray leaves on moving objects are in form of connected sequences of intersections with the TAO. Each intersection point corresponds to an animation time and a position on an object (the moving object), and in conjunction with the trace segments that connect to it, a trace processor can determine and interpolate surface properties, such as attached shaders, normals, UV or texture coordinates, etc.

The sampling of the true trace thus depends on the geometry of the objects and the sampling of the motion used for the creation of the TAO. In order to composite different motion effects for one pixel, however, a sampling should be consistent in time for all traces. This super-sampling should be dense enough so that depth conflicts can be resolved adequately. In order to avoid trace segments that end in the middle of a sampling interval, the times of all intersection points can be taken into account in addition to a uniform sampling of the maximum time extents of all traces. Surface properties are interpolated linearly from the intersection points.

At this stage, the trace processor also determines the visibility of trace fragments during each sampling interval, without deleting obstructed trace fragments, however. Instead, the motion effects program decides whether obstructed segments should be discarded.

Motion Effects Programming

The effect of a motion-suggesting feature can be had by including a motion effects program that provides shading over a time span, which can then contribute to a compositor to be combined with shading for an instant in time of the objects in a scene, which may be conventional shading. As used herein, a "motion shader" is a motion effects program and the motion effects program takes in artist inputs, scene geometry and emits contributions to each pixel color due to the particular motion effect.

For example, a speed line motion effects program might take as inputs a set of seed points, parameters defining a fall-off function and then also take in scene geometry and movement information. From that, the motion effects program can emit, for a pixel P, that motion effects should add color C to pixel P. Doing this over all pixels and compositing, taking into account depth and alpha (transparency/opacity) as needed, the result is an image with the speed lines automatically included and falling off as indicated by the fall-off function. Artist parameters might include the thickness of the lines, the seed points that correspond to the lines, and other parameters.

Motion shaders operate on the super-sampled representation of the traces. The shader gets called per object per motion effect. Thus, one shader call processes all traces of one object for a given motion effect. Other implementations are possible, but this one has an advantage that the actual effect can be made a function of the shader, which allows for artist flexibility.

A motion effect program operates on the resampled representation of a trace. The motion effect program might be called, by a renderer or other system, once per object and in that call, the motion effect program will process all trace fragments associated with that object. This can then be repeated for all of the other active motion effect programs and objects.

A motion effect program might have two options when processing an individual trace fragment. It can simply discard the fragment, in which case no contribution to the final pixel color will be made, or it can assign a color, depth, and pixel coverage value and output the fragment for compositing. The coverage value determines the amount of influence a fragment has on the final pixel color in the compositing step. When making this decision, the motion effect program can query an object's surface shader, evaluate auxiliary textures (e.g., noise textures, painted texture maps, etc.), or use interpolated object information. Thus, the expected output of a shader is a set of trace fragments (selected from the super-sampled representation of the traces) with a color and a coverage value assigned.

Compositing

By the emitted fragments, each motion effects program has determined what its contribution to the pixel should be. The remaining issue is to combine all of the fragments to determine the final pixel color. As described above, a clamped additive model based on the coverage value can be used to allow for correct motion blur.

The fragments are processed in the order of their depth. The coverage values of the fragments, which range between 0 and 1 (or some other scale), are added up until a full coverage of 1 is reached or all fragments are processed. If the coverage value exceeds 1, the last processed fragment's coverage value is adjusted so that the limit is reached exactly. The final pixel color is computed by summing up the processed fragment's colors weighed by the corresponding coverage values. The accumulated coverage value is used as the alpha value for the final pixel color.

For certain compositing operations, a depth value can be required. As the color values resulting from the renderer are an aggregation of illumination from different depths, this problem often cannot be solved in general. However, assuming that the motion effects and the other images in the compositing step are separated in depth, a compositor can use one of the fragment's depth value for the pixel depth value.

Artist Inputs

Various components of the system described above might be implemented to allow for artist inputs at a high-level. For example, the compositor might allow artist input of variations in the compositing process. The shaders might allow for user input as to which set of shader parameters to use or what kind of motion effect suggestive of motion to use. A trace constructor might have artist inputs for seed points of interest to that artist. Other examples might also apply.

For example, inputs might be provided to accept values A and B from an artist, wherein the range of time for the time-aggregate object is [t+A, t+B] for the frame being rendered and designated by t. Typically, A will be a negative value and B will be a positive value, but this is not required; for example A=−24 and B=0, so that all of the motion depiction is trailing (depicting the motion of the past 24 frames).

The selection of speed line "seed points", as well as the steps used to define the appearance of the speed lines (color, width, etc.), are subject to the implementation of the motion effect and thus may vary or depend on artist input. The apparatus provided herein provides a framework for implementing and running such effects efficiently.

In some cases, the seed points can be randomly and/or manually selected vertices of the input mesh or other points.

In some cases, the artist can specify the effect over time (e.g., how it decays). In some instances, a linear decay over time is desired. In other instances, arbitrary functions might be supported and/or taking into account not only the distance/time from the current object position, but any factor that can be determined from the input data. For example, this could also include auxiliary textures on the objects to modulate the speed line weight.

The system might be so flexible as to allow artist input of (1) a desired rate of decay, (2) "linear decay" or "exponential decay", (3) seed point selection, (4) whether to include "strobe" copies and the number of strobe copies to include, etc. From this information, the motion program can generate all of the additional geometry and the rendering engine can render it. If the result is not to the artist's liking, the artist inputs can be changed and the rendering rerun, with the idea being that the artist does not have to create additional geometry, but just has to provide the artist inputs.

However, it might be so flexible that some technical programming is needed, in which case the inputs might be split into inputs for a technical "motion program artist", e.g., a technical director, while others are for non-technical users of the animation system.

Example Motion Effects Programs

Some examples of motion effects programs, expressed in pseudocode are presented below. In these examples, a trace segment is comprises two end points, denoted ts.left and ts.right. the data structures representing each of the end points includes information about the animation time at which this surface location has been intersected by the view ray and linearly interpolated surface properties. They may be interpolated further with a function named INTERPOLATE( ), which takes a trace segment and a time at which it should be interpolated as parameters. The variable ts.center designates the interpolation of the end points' properties to the center of the segment. The SHADE( ) function evaluates the object's surface shader with the given surface parameters and returns its color. The animation time of the current frame being rendered is denoted as "current time." The output of a motion effect program is a number of fragments, each with a color and coverage value, that represent the effect's contribution to the pixel color. Passing a fragment to the compositing engine is designated by the keyword emit.

EXAMPLE

"Instant Render" Motion Program

This basic program renders an object at a single instant in time. The program loops through all trace segments and checks whether the desired time lies within a segment. If so, it interpolates the surface parameters to that point, evaluates the surface shader accordingly, and emits just one fragment to the compositing stage with a coverage value of 1. Any surfaces behind that fragment will be hidden, as is expected from an opaque surface.

```
INSTANT RENDER(time)
  for all trace segments ts do
    if ts.left.time <= time < ts.right.time then
      eval at := INTERPOLATE(ts, time)
      color := SHADE(eval at)
      coverage := 1
      emit fragment(color, coverage)
```

EXAMPLE

"Weighted Motion Blur" Motion Program

Photorealistic motion blur integrates the surface luminance within a given shutter time. This motion program can extend this process with an arbitrary weighting function w(t) that can be used both for realistic and stylized blurring. For photorealistic blur, the weighting function is the temporal sampling reconstruction filter function. A flat curve corresponds to the commonly used box filter. In general, the weighting function need not be normalized, which means that luminance energy is not necessarily preserved. This flexibility increases the possibilities for artistic stylization. For example, a flat curve with a spike at t=0 results in motion blur that has a clearly defined image of the object at the current frame time.

```
MOTION BLUR(w(t))
  for all trace segments ts do
    if ts time interval overlaps with {t | w(t) > 0} then
      clip ts against {t | w(t) > 0}
      color := SHADE(ts.center)
      δt := ts.right.time - ts.left.time
      coverage := δt · w(ts.center.time)
      emit fragment(color, coverage)
```

Thos motion effect program describes weighted motion blur in its most basic form. A more advanced implementation could take more than one surface shading sample within a segment and use a higher order method for integrating the luminance. With the given effect program, however, the fidelity of the image can be improved by increasing the global trace sampling rate.

EXAMPLE

"Speed Lines" Motion Program

Speed lines are produced by seed points on an object that leave streaks in the space through which they travel. The seed points can be distributed automatically or placed manually. The motion program computes the shortest distance between trace segments and seed points. If the distance is smaller than a threshold, the seed point has passed under or close to the pixel, and the pixel should be shaded accordingly. A falloff function based on distance or time can be used to give the speed line a soft edge.

```
SPEED LINES(seed vertices, width, length)
  for all trace segments ts do
    for all seed vertices v do
      if DISTANCE(ts, v) < width
        and current time - ts.center.time < length then
        color := SHADE(ts.center)
        compute coverage using a falloff function
        emit fragment(color, coverage)
```

EXAMPLE

"Stroboscopic Images" Motion Program

This effect places multiple instant renders of the object at previous locations. It imitates the appearance of a moving object photographed with stroboscopic light. The intensity of the stroboscopic images can be attenuated over time to make them appear as if they are washing away. The motion effect program can keep the locations of the stroboscopic images fixed throughout the animation, but they could also be made to move along with the object. The falloff function can be composed of factors considering the time of the stroboscopic image, geometric properties of the mesh (e.g., the angle between the motion vector and the normal at a given point), or an auxiliary modulation texture to shape the appearance of the stroboscopic images.

```
STROBOSCOPIC IMAGES(spacing, length)
for all trace segments ts do
   if ts.left.time < current time − length then
      t1 mod := ts.left.time modulo spacing
      t2 mod := ts.right.time modulo spacing
      if t1 mod <=0 < t2 mod then
         color := SHADE(ts.center)
         compute coverage using a falloff function
         emit fragment(color, coverage)
```

EXAMPLE

"Time Shift" Motion Program

The time shifting program modulates the instantaneous time selected from the trace. This can be used in conjunction with the INSTANT RENDER so that each pixel in the image may represent a different moment in time. If fast-moving parts of an object are shifted back in time proportional to the magnitude of their motion, these parts appear to be lagging behind. They "catch up" with the rest of the object when it comes to a stop or changes direction. This effect is only visible if an object's motion is not uniform across the surface, as in the case of rotation. In this motion program, $v_{motion}$ designates the motion vector of the corresponding part of the surface.

```
TIME SHIFT(ts, shift magnitude)
   time shift := |ts.center.v_motion| · shift magnitude
   shift time values in trace segment ts according to time shift
   return ts
```

EXAMPLE

Images

Figure 10:
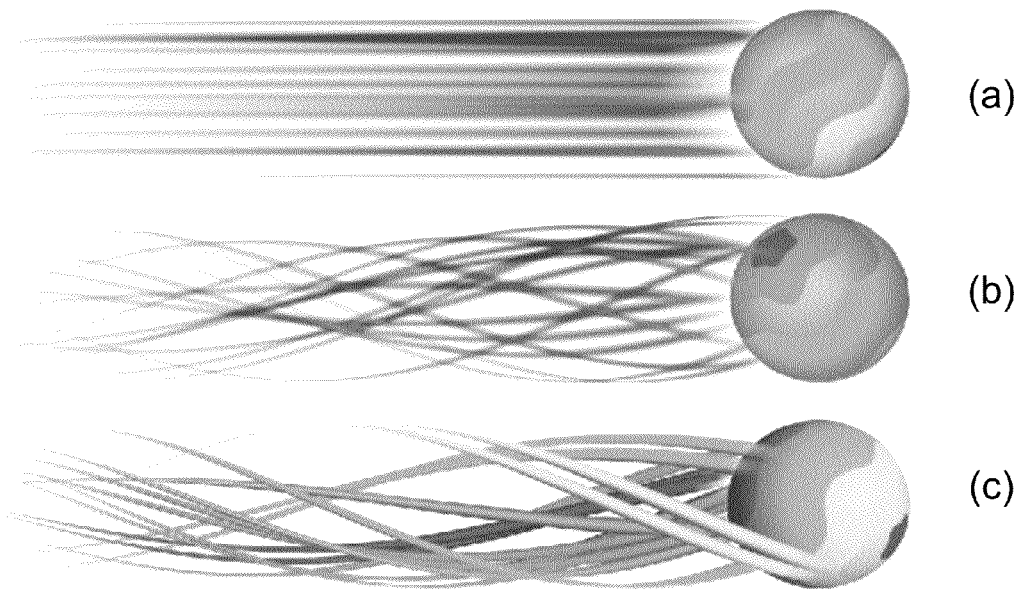
FIG. 10 illustrates different speed line styles.

FIG. 10 illustrates different speed line styles. Customized styles can be achieved in a flexible manner, similar to the way programmable surface shaders are used to generate customized surface appearances. In FIG. 10(a), the ball is translating, whereas in FIGS. 10(b)-(c), the ball is also rotating. FIGS. 10(a)-(b) use a speed lines effect with a falloff function that fades in linearly at both ends of the speed lines and modulates the width of the speed line over time. For the image in FIG. 10(c), the distance of the seed point to the current pixel is used to manipulate the normal passed to the surface shader, giving a tubular appearance.

Figure 11:
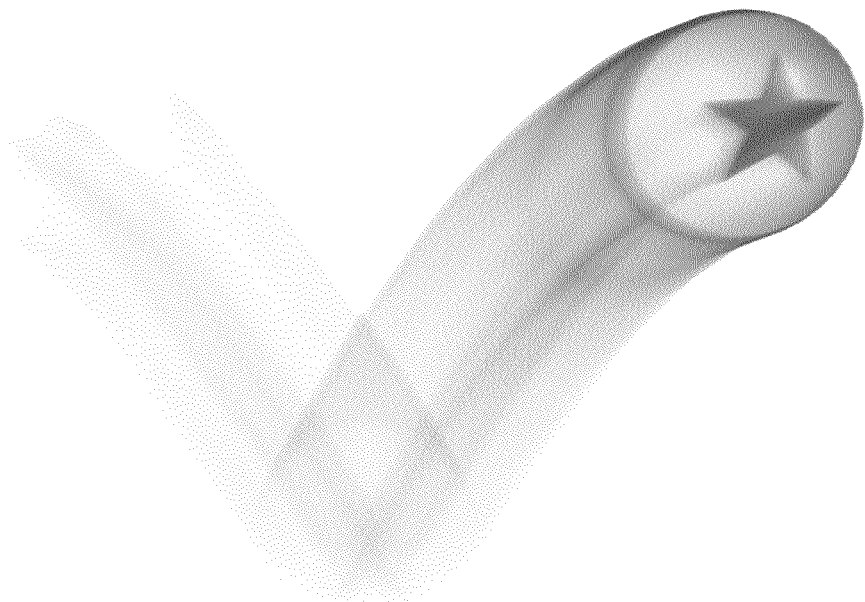
FIG. 11 illustrates a bouncing toy ball, rendered with a modified version of a motion blur effect.

FIG. 11 illustrates a bouncing toy ball, rendered with a modified version of a motion blur effect. The effect program computes a reference time for the input trace, and uses the difference between this reference time and the current time to determine the amount of blur, or the shutter opening time in conventional terms. As a result, the blur increases toward the end of the trail.

Figure 12:
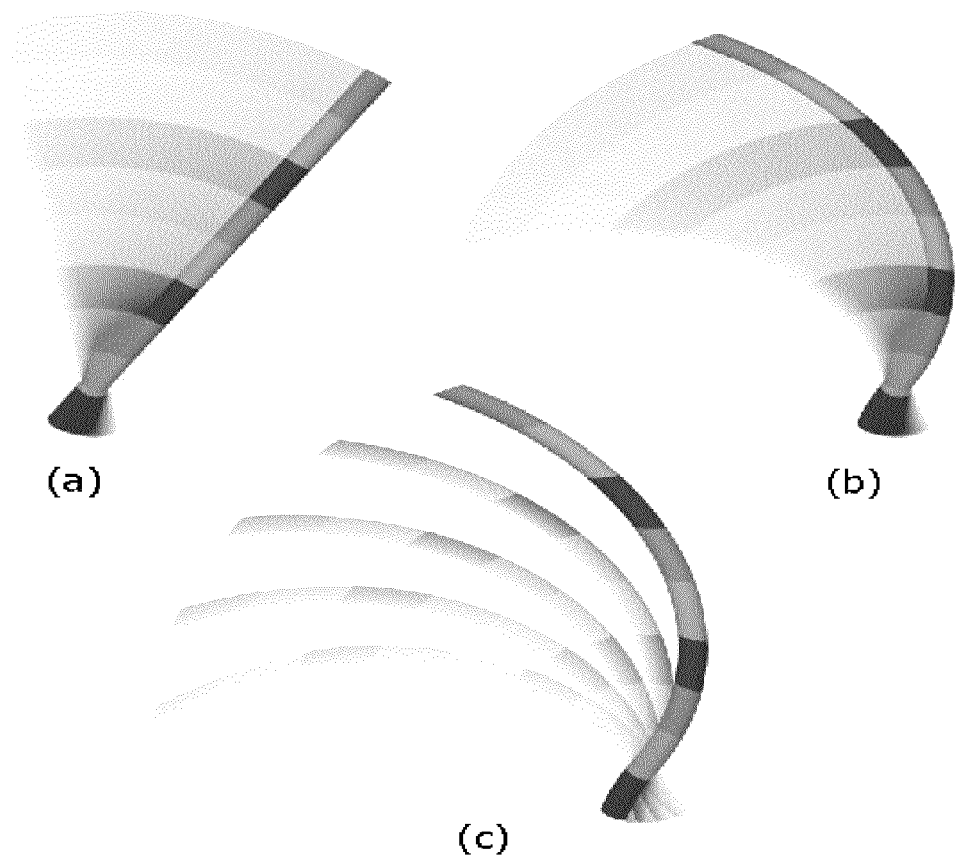
FIG. 12 illustrates a combination of effects.

FIG. 12 illustrates a combination of effects. The result shows a rod spinning about an axis near its lower end. FIG. 12(a) shows a combination of a MOTION BLUR effect that uses a slightly ramped weighting function with an INSTANT RENDER effect to render a crisp copy of the rod. FIG. 12(b) additionally uses the TIME SHIFT function with a negative shift magnitude so that quickly moving surface parts lag behind. These parts "catch up" when the rod stops moving or changes direction. In FIG. 12(c), MOTION BLUR is replaced with a STROBOSCOPIC IMAGES effect. The falloff function fades the stroboscopic images out as time passes and additionally uses the angle between the motion vector and the surface normal to make the rod fade toward its trailing edge.

Figure 13:
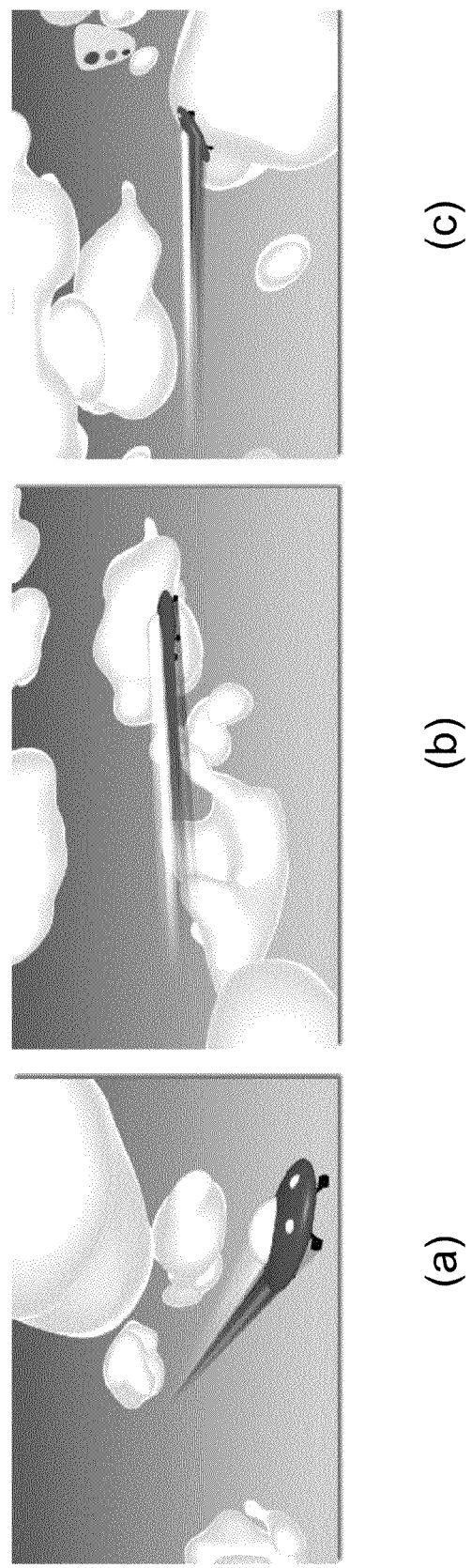
FIG. 13 illustrates attached speed lines.

FIG. 13 illustrates attached speed lines on a model of a UFO to accentuate and increase the sensation of its speed. To keep the effect convincing when the camera is moving with the UFO, the length and opacity of the speed lines are animated over time. An animated noise texture is sampled using the texture coordinates from the seed point of each speed line, which gives the attenuation value for that speed line.

As has now been described, motion representation and effects can be provided as first-class entities within the rendering process and be a useful part of an animation toolbox, especially in cases where the signal-processing correct blurring process is not what an artist wishes to use to convey motion. An animator can stylize a depiction of motion in order to stimulate the brain in a certain manner, using high-level tools in a general and flexible manner. The apparatus and methods described herein can provide a general-purpose rendering mechanism that can accommodate a variety of visualization styles, analogous to the way surface shaders can implement different surface appearances. Many effects from traditional mediums are directly related to an object's movement through a region of space and take the form of transient, ephemeral visuals left behind. As explained herein, this concept can be extended beyond the basic concept of a surface shader, which is evaluated on an infinitesimal portion of an object's surface at one instant in time, to that of a programmable motion effect, which is evaluated with global knowledge about all (or many) portions of an object's surface that pass in front of a pixel (or nearby) during an arbitrary long sequence of time. With this added information, our programmable motion effects can cause pixels to be colored long after (or long before) an object has passed in front of them, enabling speed lines, stroboscopic copies, streaking, stylized blurring and other motion effects. By rendering different portions of an object at different times, the effects also encompass stretching and bending.

Traditional motion blur is just a special case within this more generalized system, implemented as a motion effect program that averages the relevant surface contributions during a specified shutter time. In general, however, the methods described herein can dissolve the classic notion of a scene-wide shutter time and allow each motion effect program to independently specify its operating time range, so that a single rendered frame may compose information from different periods of time.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the inven-

What is claimed is:

1. A method for generating images to be viewable on a display using a computer that are generated based on scene geometry obtained from computer-readable storage and animation data representing changes over time of elements of the scene geometry, the method comprising:
   receiving an object comprising at least some of the scene geometry and at least some of the animation data;
   receiving motion depiction parameters;
   generating a time aggregate object (TAO) comprising an aggregate graphical representation of an object at different times in a movement;
   identifying a view ray;
   generating a trace at a first resolution, wherein the trace comprises the intersection of points of the ray and the TAO, wherein the first resolution is determined by:
     selecting a first, uniform sampling frequency;
     calculating a non-linearity between vertex positions;
     comparing the non-linearity between vertex positions to a coursing threshold; and
     adding sampling points if the non-linearity exceeds the coursing threshold;
   regenerating the trace, wherein the trace is regenerated at a scene-wide, second resolution;
   generating trace fragments from the regenerated trace representing elements of the scene geometry over a nonzero time period, wherein a trace fragment includes data about the elements and includes temporal information over the nonzero time period indicating times, for given positions of a camera view port, at which given portions of elements of scene geometry appear at those given positions;
   generating shading for the trace fragments, wherein the images including contributions from the trace fragments would suggest motion of the represented elements to a viewer of the generated images;
   combining the shading for the trace fragments with shading for the scene geometry at an instant in frame time equal to a current frame time; and
   rendering, for at least one pixel, a pixel color based on at least some of the generated shading such that motion effects contribute to the features that would suggest the motion.

2. The method of claim 1, further comprising repeating the generating shading step, once for each of a plurality of motion effects.

3. The method of claim 2, wherein the received motion depiction parameters include, for each motion effect, an indication of the plurality of frames from which the motion effect will depend and an indication of the plurality of frames in which the motion effect will appear.

4. The method of claim 2, further comprising:
   generating, using a computer, salient features of the scene geometry, the motion of which the motion effects are to represent; and
   generating the motion effects using surfaces of the salient features.

5. The method of claim 1, wherein the generation of the motion effect comprises generation of one of:
   a speedline;
   a stroboscopic image; and
   a time shift image.

6. The method of claim 5, wherein the speedline has a first end and a second end, and wherein the speedline linearly fades at least one of the first end and the second end.

7. A non-transitory computer-readable medium containing program instructions that, when executed by a computer, generate images to be viewable on a display using a computer that are generated based on scene geometry obtained from computer-readable storage and animation data representing changes over time of elements of the scene geometry, comprising:
   program code for receiving an object comprising at least some of the scene geometry and at least some of the animation data;
   program code for receiving motion depiction parameters;
   program code for generating a time aggregate object (TAO) comprising an aggregate graphical representation of an object at different times in a movement;
   program code for identifying a view ray;
   program code for generating a trace at a first resolution, wherein the trace comprises the intersection of points of the ray and the TAO, wherein the first resolution is determined by:
     selecting a first, uniform sampling frequency;
     calculating a non-linearity between vertex positions;
     comparing the non-linearity between vertex positions to a coursing threshold; and
     adding sampling points if the non-linearity exceeds the coursing threshold;
   program code for regenerating the trace, wherein the trace is regenerated at a scene-wide, second resolution, wherein the second resolution comprises a series of second animation times;
   program code for generating trace fragments from the regenerated trace, the trace fragments representing elements of the scene geometry over a nonzero time period, wherein a trace fragment includes data about the elements and includes temporal information over the nonzero time period indicating times, for given positions of a camera view port, at which given portions of elements of scene geometry appear at those given positions;
   program code for generating shading for the trace fragments, wherein the images including contributions from the trace fragments would suggest motion of the represented elements to a viewer of the generated images;
   program code for combining the shading for the trace fragments with shading for the scene geometry at an instant in frame time equal to a current frame time; and
   program code for rendering, for at least one pixel, a pixel color based on at least some of the generated shading such that motion effects contribute to the features that would suggest the motion.

8. The non-transitory computer-readable medium of claim 7, further comprising program code for repeating the generating shading step, once for each of a plurality of motion effects.

9. The non-transitory computer-readable medium of claim 8, wherein the received motion depiction parameters include, for each motion effect, an indication of the plurality of frames from which the motion effect will depend and an indication of the plurality of frames in which the motion effect will appear.

10. The non-transitory computer-readable medium of claim 8, further comprising:
    program code for generating, using a computer, salient features of the scene geometry, the motion of which the motion effects are to represent; and
    program code for generating the motion effects using surfaces of the salient features.

11. The non-transitory computer-readable medium of claim 7, wherein the program code for generation of the motion effect comprises code for generation of one of:
    a speedline;
    a stroboscopic image; and
    a time shift image.

12. The non-transitory computer-readable medium of claim 11, wherein the speedline has a first end and a second end, and wherein the speedline linearly fades at least one of the first end and the second end.

13. An animation editing system for editing representations of images of an animation sequence and animation data representing changes over time of elements of the images, so as to suggest motion of at least one of those elements, comprising:
- an input for reading in data corresponding to an image;
- an input for motion depiction parameters;
- an interface for artist input;
- an interface for image output;
- a time-aggregate object generator, wherein a time-aggregate object is a virtual object representing the element over a plurality of the images, wherein the time-aggregate object includes temporal information over a non-zero time period indicating times, for given positions of a camera view port, at which given portions of the element appear at those given positions;
- a trace constructor that:
  - identifies a view ray; and
  - generates a trace at a first resolution, wherein the trace comprises the intersection of points of the ray and the generated time-aggregate object, wherein the first resolution is determined by:
    - selecting a first, uniform sampling frequency;
    - calculating a non-linearity between vertex positions;
    - comparing the non-linearity between vertex positions to a coursing threshold; and
    - adding sampling points if the non-linearity exceeds the coursing threshold;
  - regenerates the trace at a scene-wide, second resolution; and
  - generates a plurality of trace fragments from the regenerated trace;
- an interface to a shader for generating shading according to a set of motion depiction parameters and at least one time-aggregate object; and
- a renderer for rendering, for at least one pixel, a pixel color based on at least some of the generated shading such that motion effects contribute to the features that would suggest the motion.

14. The animation editing system of claim 13, further comprising:
- a compositor that combines pixel color values from elements of the images and from at least one time-aggregate object process.

15. The animation editing system of claim 13, wherein the motion effects rendered by the renderer comprise one of:
- a speedline;
- a stroboscopic image; and
- a time shift image.

16. The animation editing system of claim 15, wherein the speedline has a first end and a second end, and wherein the speedline linearly fades at least one of the first end and the second end.

* * * * *